(12) United States Patent
Takeuchi et al.

(10) Patent No.: US 9,956,659 B2
(45) Date of Patent: May 1, 2018

(54) DUST COLLECTING DEVICE AND POWER TOOL HAVING THE SAME

(71) Applicant: MAKITA CORPORATION, Anjo-shi, Aichi (JP)

(72) Inventors: Hajime Takeuchi, Anjo (JP); Masanori Furusawa, Anjo (JP); Yoshiro Tada, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 1003 days.

(21) Appl. No.: 14/077,943

(22) Filed: Nov. 12, 2013

(65) Prior Publication Data

US 2014/0138114 A1 May 22, 2014

(30) Foreign Application Priority Data

Nov. 19, 2012 (JP) .................................. 2012-253740
Jan. 21, 2013 (JP) .................................. 2013-008512

(51) Int. Cl.
 *B23Q 11/00* (2006.01)
(52) U.S. Cl.
 CPC ...... *B23Q 11/0046* (2013.01); *B23Q 11/0071* (2013.01)
(58) Field of Classification Search
 CPC ............ B23Q 11/0046; B23Q 11/0071; B23Q 11/006; B25G 3/20
 See application file for complete search history.

(56) References Cited

U.S. PATENT DOCUMENTS

| 1,334,430 | A | * | 3/1920 | Ayotte | .................... | E21B 21/07 |
| | | | | | | 15/409 |
| 3,442,337 | A | * | 5/1969 | Astrom | ................ | B23Q 11/004 |
| | | | | | | 173/61 |
| 3,490,779 | A | * | 1/1970 | Bixby | ................ | B23Q 11/0046 |
| | | | | | | 279/96 |
| 3,511,322 | A | * | 5/1970 | Holman | ............. | B23Q 11/0046 |
| | | | | | | 126/25 A |

(Continued)

FOREIGN PATENT DOCUMENTS

| DE | 4342484 | A1 | * | 4/1995 | ............. | B08B 15/04 |
| EP | 0426321 | A1 | * | 5/1991 | ......... | B23Q 11/0046 |

(Continued)

OTHER PUBLICATIONS

Apr. 28, 2015 Office Action issued in European Patent Application No. 13 193 199.0.

(Continued)

*Primary Examiner* — Hemant M Desai
*Assistant Examiner* — Lucas Palmer
(74) *Attorney, Agent, or Firm* — Oliff PLC

(57) ABSTRACT

A dust collecting device 140 is provided which is attached to an electric hammer 101 having a side handle 110 which is removably attached to a body 103. The dust collecting device 140 has a dust collecting hood 141 and a hose holder 145. The side handle 110 has a mounting ring 111 which is mounted on the body 103, a grip 121 and a grip securing part 131. The grip 121 is secured by moving relative to the grip securing part 131 in a direction crossing an axial direction of the hammer bit 200. By this relative movement for securing the grip 121, the hose holder 145 is held between the grip 121 and the grip securing part 131.

9 Claims, 21 Drawing Sheets

(56) References Cited

U.S. PATENT DOCUMENTS

| | | | | | |
|---|---|---|---|---|---|
| 3,638,737 | A | * | 2/1972 | Moates | B23Q 11/0046 173/60 |
| 4,097,176 | A | * | 6/1978 | Wanner | B23Q 1/0036 175/213 |
| 4,207,953 | A | * | 6/1980 | Reibetanz | B23B 49/006 173/21 |
| 4,276,675 | A | * | 7/1981 | Pioch | B23B 45/001 16/426 |
| 4,368,556 | A | * | 1/1983 | Wanner | B23B 45/001 16/436 |
| 4,915,245 | A | * | 4/1990 | Wouters | A47L 5/18 15/409 |
| 5,090,499 | A | * | 2/1992 | Cuneo | B23Q 11/0046 173/75 |
| 5,113,951 | A | * | 5/1992 | Houben | B25D 11/005 173/75 |
| 5,199,501 | A | * | 4/1993 | Kluber | B23Q 11/0046 173/171 |
| 5,467,835 | A | * | 11/1995 | Obermeier | B23Q 11/0046 173/75 |
| 5,690,451 | A | * | 11/1997 | Thurler | B23B 49/006 408/113 |
| 5,725,422 | A | * | 3/1998 | Leweck | B24B 23/005 16/426 |
| 6,047,693 | A | * | 4/2000 | Yamami | B23D 59/006 125/13.01 |
| 6,484,361 | B1 | * | 11/2002 | Schmid | B25F 5/026 16/110.1 |
| 6,601,478 | B1 | | 8/2003 | Hanson | |
| 7,073,612 | B2 | * | 7/2006 | Finchum | E21B 21/16 175/211 |
| 7,455,486 | B2 | * | 11/2008 | Britz | A47L 9/102 175/213 |
| D590,225 | S | * | 4/2009 | Sell | D8/68 |
| 7,661,195 | B1 | * | 2/2010 | Wood | B23D 59/006 30/124 |
| D677,545 | S | * | 3/2013 | Sell | D8/70 |
| 8,967,923 | B2 | * | 3/2015 | Lerch | B23Q 11/0071 408/110 |
| 2001/0052429 | A1 | * | 12/2001 | Frenzel | B23Q 11/0046 175/210 |
| 2005/0000052 | A1 | * | 1/2005 | Byles | A47L 9/02 15/314 |
| 2006/0185484 | A1 | * | 8/2006 | Sasaki | B23D 59/006 83/100 |
| 2008/0202781 | A1 | * | 8/2008 | Nishikawa | B23Q 11/0046 173/104 |
| 2010/0155095 | A1 | * | 6/2010 | Furusawa | B23Q 11/0046 173/198 |
| 2011/0008117 | A1 | * | 1/2011 | Kasuya | B23Q 11/0046 408/67 |
| 2011/0008118 | A1 | * | 1/2011 | Yoshikane | B23Q 11/0046 408/67 |
| 2011/0127057 | A1 | * | 6/2011 | Roehm | B25F 5/006 173/162.2 |
| 2011/0185869 | A1 | * | 8/2011 | Wasielewski | B23Q 11/0042 83/100 |
| 2011/0226502 | A1 | * | 9/2011 | Bito | B23Q 11/0046 173/197 |
| 2011/0308830 | A1 | * | 12/2011 | Furusawa | B23Q 11/0046 173/198 |
| 2012/0043101 | A1 | * | 2/2012 | Ishikawa | B28D 7/02 173/75 |
| 2012/0210535 | A1 | * | 8/2012 | Miwa | B23Q 11/0046 15/246 |
| 2013/0206440 | A1 | | 8/2013 | Ikuta et al. | |
| 2013/0213681 | A1 | * | 8/2013 | Ikuta | B23Q 11/0046 173/75 |

FOREIGN PATENT DOCUMENTS

| | | | |
|---|---|---|---|
| FR | 2 702 171 A1 | 9/1994 | |
| FR | 2702171 A1 * | 9/1994 | B23Q 11/0046 |
| JP | 2005305577 A * | 11/2005 | |
| JP | A-2005-305577 | 11/2005 | |
| JP | A-2011-16212 | 1/2011 | |
| JP | A-2012-16789 | 1/2012 | |
| WO | 2012/005224 A1 | 1/2012 | |
| WO | WO 2012/005224 A1 | 1/2012 | |
| WO | WO 2012005224 A1 * | 1/2012 | B23Q 11/0046 |

OTHER PUBLICATIONS

Apr. 27, 2015 Office Action issued in Chinese Patent Application No. 201310573318.4.
Mar. 23, 2016 Office Action issued in Japanese Patent Application No. 2012-253740.
May 24, 2016 Office Action issued in Japanese Patent Application No. 2013-008512.
Extended Search Report issued in European Patent Application No. 13193199.0 dated Mar. 5, 2014.

* cited by examiner

DUST COLLECTING DEVICE AND POWER TOOL HAVING THE SAME

CROSS REFERENCE TO RELATED APPLICATION

This application claims priority to Japanese Patent Applications No. 2012-253740 filed on Nov. 19, 2012 and No. 2013-008512 filed on Jan. 21, 2013, the entire contents of which are incorporated by reference herein.

BACKGROUND OF THE INVENTION

Field of the Invention

The invention relates to a dust collecting device for collecting dust generated during operation of a power tool, and a power tool having the dust collecting device.

Description of the Related Art

Japanese laid-open patent publication No. 2012-16789 discloses a dust collecting device having a hose holder for holding a dust transferring hose. The hose holder is mounted on a side handle which can be attached to a tool body of an impact tool. Specifically, by tightening a bolt to fasten two extending ends of the grip to the tool body, the hose holder is mounted on the side handle. Further, Japanese laid-open patent publication No. 2011-16212 discloses a dust collecting device in which dust generated during operation of a power tool is collected into a dust collecting cup and the collected dust in the dust collecting cup is forcibly sucked through a dust transferring hose by a dust collector connected to the dust collecting cup. The dust transferring hose is held by a belt which is disposed so as to surround the outer surface of the tool body.

SUMMARY OF THE INVENTION

In the above-described known dust collecting devices, however, in order to mount the dust transferring hose to the tool body, a user needs to tighten the bolt while holding the grip and the hose holder, or tighten the loosely arranged belt while holding the dust transferring hose. In other word, under a situation in which two hands hold components respectively, a user needs to operate further mounting operation of the dust collecting device. Therefore, the mounting of a dust transferring hose to a power tool is desired to be further improved.

It is, accordingly, an object of the invention to provide a dust collecting device in which component parts for holding a dust transferring member is improved.

The above-described problem is solved by the claimed invention. According to the invention, a representative dust collecting device which is attached to a power tool is provided. In other word, the dust collecting device is attachable to the power tool. The power tool is configured to actuate a tool bit which is coupled to a front end region of a tool body along a predetermined longitudinal direction. The dust collecting device includes a dust collecting member which has a dust suction port for sucking dust, and a holding member which holds a dust transferring member with respect to the tool body. The dust transferring member is removably attached to the holding member, and dust sucked up into the dust collecting member through the dust suction port is transferred downstream through the dust transferring member. The power tool is configured such that an auxiliary handle designed to be held by a user is removably attached to the tool body. The auxiliary handle includes a mounting part which is mounted on the tool body, a handle which extends in a handle extending direction crossing the longitudinal direction, and an engagement part which is connected to the mounting part and engageable with the handle. The handle is engaged and secured to the engagement part by moving relative to the engagement part in the handle extending direction. The holding member is held between the engagement part and the handle by the relative movement of the engagement part and the handle in the handle extending direction during attaching operation of the auxiliary handle to the tool body. The structure of holding the holding member between the engagement part and the handle here typically represents the structure of clamping the holding member therebetween. Alternatively, another member may be disposed between the engagement part and the handle and configured to hold the holding member such that the holding member is held between the engagement part and the handle. Typically, the holding member is fixed to the tool body, therefore the holding member is also called a fixed member.

According to the invention, the holding member is held by moving the handle relative to the engagement part to secure the handle. Thus, the holding member is reliably and securely held between the engagement part and the handle without the need of providing another member for securing the holding member to the handle with the handle and the holding member held by the user. Further, the holding member is held by an attaching operation of the auxiliary handle which is relatively movement of the handle to the mounting part, so that the operation of attaching the holding member is simplified. Further, with the construction in which the handle extends in the handle extending direction crossing the longitudinal direction, the holding member is attached in a rational manner to the handle having a part which is designed to be held by a user and extends in the handle extending direction.

According to a further aspect of the invention, the engagement part and the handle move relative to each other in the handle extending direction by screwing the engagement part into the handle. Further, the holding member is held between the engagement part and the handle by the relative movement caused by screwing the engagement part into the handle.

According to this aspect, the engagement part and the handle is moved relative to each other by screwing the engagement part into the handle. Therefore, the holding member is held by turning the handle or the engagement part to screw the engagement part into the handle. Specifically, the handle is secured to the engagement part by screwing and thereby the holding member is held. Thus, the operation of attaching the holding member is simplified.

According to a further aspect of the invention, the holding member includes a rotation preventing part for preventing the holding member from rotating relative to the engagement part.

According to this aspect, provision of the rotation preventing part prevents corotation of the holding member caused by the screwing. Therefore, the holding member is reliably and securely held at a position of the holding member with respect to the tool body which is predetermined before screwing the engagement part into the handle.

According to a further aspect of the invention, the handle has a flange on the engagement part side in the handle extending direction, and the holding member is held between the engagement part and the flange.

According to this aspect, the holding member is held by the flange with stability, particularly by provision of the construction in which the holding member is held between the engagement part and the flange.

According to a further aspect of the invention, the mounting part is formed as a ring-like member which surrounds the tool body. The handle extending direction in which the handle extends is in conformity with a radial direction of the ring-like member, and the holding member is held between the engagement part and the handle by the relative movement of the engagement part and the handle in the handle extending direction.

According to this aspect, with the construction in which the first direction coincides with a radial direction of the ring-like member, the holding member is held between the engagement part and the handle by moving the handle toward the tool body. Specifically, the force of moving the handle acts toward the center of the ring-like member, so that the ring-like member is prevented from rotating when attaching the auxiliary handle and the holding member to the tool body.

According to a further aspect of the invention, the holding member has a movement preventing part for preventing the dust transferring member from moving in a dust transferring member extending direction in which the dust transferring member extends.

According to this aspect, the dust transferring member is prevented from moving relative to the holding member by vibration which is caused when the power tool is driven. Thus, the holding member reliably and securely holds the dust transferring member.

According to a further aspect of the invention, the movement preventing part is formed by one projection which engages with an outer circumferential surface of the dust transferring member. The projection typically has a rib-like shape.

According to this aspect, the movement preventing part in the form of the projection can reinforce the holding member. Specifically, the projection has two functions of preventing movement of the dust transferring member and reinforcing the holding member. Further, by provision of only one projection, the holding member is easily manufactured.

According to a further aspect of the invention, the dust collecting member is disposed to surround the tool bit.

According to this aspect, with the construction in which the dust collecting member surrounds the tool bit, the dust collecting member is held by the tool bit. Therefore, the front end of the dust transferring member attached to the dust collecting member is held, so that the dust transferring member is held with respect to the tool body by the holding member and the dust collecting member with stability.

According to the invention, a power tool is provided which has the dust collecting device as described in any one of the above-described aspects.

According to the invention, a representative dust collecting device which is attached to a power tool is provided. In other word, the dust collecting device is attachable to the power tool. The power tool is configured to actuate a tool bit which is coupled to a front end region of a tool body along a predetermined longitudinal direction. The dust collecting device includes a dust collecting member which is capable of collecting dust generated during an operation, and a holding member which is engaged with a tool body inside and holds a dust transferring member to the tool body, the dust transferring member being capable of transferring dust collected by the dust collecting member. The "tool body inside" represents an inward side of the outer surface of the tool body. The "power tool" typically represents a hammer which performs hammering operation on a workpiece by linear motion of the tool bit in the axial direction, or a hammer drill which performs hammer drill operation on a workpiece by linear motion of the tool bit in the axial direction and rotation around its axis.

According to the invention, the holding member is engaged with the tool body inside and holds the dust transferring member to the tool body. Compared with the known construction in which the band is wrapped around outside the tool body, the holding member itself is effectively prevented from interfering with the operation. As a result, a decrease in workability during operation is prevented.

According to a further aspect of the invention, the holding member includes a deformable band. According to this aspect, by using the deformable band in a part of the holding member which is engaged with the dust transferring member, the band is engaged with the dust transferring member while conforming to the dust transferring member. Thus, engagement between the holding member and the dust transferring member is stabilized.

According to a further aspect of the invention, the holding member further includes a band locking part which is capable of locking the band. The band locking part is changed its state between a locked state in which the band is locked and a released state in which the locked state of the band is released.

According to this aspect, the dust transferring member is attached to and removed from the tool body by operating the band locking part. As a result, the dust transferring member is easily attached to and removed from the tool body.

According to a further aspect of the invention, the holding member has at least one projection and holds the dust transferring member to the tool body with the projection inserted into the tool body inside.

According to this aspect, the dust transferring member is easily fastened to the tool body by inserting the projection into the tool body inside.

According to a further aspect of the invention, a power tool which includes the dust collecting device according to any one of the above-described aspects is provided. The power tool comprised a motor that actuates the tool bit, and a housing that houses the motor and has a hollow formed inside the housing. The tool body inside is defined by the hollow, and the holding member is inserted in the hollow and holds the dust transferring member to the housing.

According to this aspect of the invention, the power tool has the dust collecting device according to any one of the above-described aspects, so that the power tool performs the same effect as the dust collecting device. Further, dust the transferring member is easily held to the tool body by inserting the fastening member into the hollow.

According to a further aspect of the invention, the housing has an inner space for housing the motor, and the hollow is open to an outer surface of the housing and not deep to communicate with the inner space.

According to this aspect, the hollow does not communicate with the inner space, so that dust and dirt is effectively prevented from entering the inside of the tool body, more specifically, the inner space that houses the motor, through the hollow.

According to a further aspect of the invention, the motor has a rotating shaft and the rotating shaft is disposed within the inner space such that an axial direction of the rotating shaft crosses the longitudinal direction. The housing has a cylindrical shape of which an axial direction is parallel to the longitudinal direction. Further, the hollow is formed in an area which is in a blind spot when the housing is viewed from behind or from the opposite side of the front end region in the longitudinal direction.

According to this aspect, the hollow is formed in an area of the housing which is in a blind spot when viewed from the user during operation. Specifically, the hollow is formed in a region which is out of user's line of vision. Therefore, both the dust transferring member and the holding member are disposed in this area, so that the members are prevented from entering user's field of vision. As a result, a decrease in workability during operation is more effectively prevented.

According to a further aspect of the invention, at least two such hollows are formed in the housing. According to this aspect, two or more projections are formed corresponding to the two or more hollows, so that the holding member is held to the tool body with more stability, compared with a construction having one projection and one hollow. As a result, the dust transferring member is held to the tool body with more stability.

According to a further aspect of the invention, the motor has a brush, and the housing includes a motor housing which defines the inner space, and a rear cover which is attached to the motor housing and is detachable for replacement of the brush. Further, the hollow is formed in the rear cover.

In the light of ease of mounting and removal of the rear cover, no other member is disposed around the rear cover. Specifically, any member which may interfere with insertion or removal of the holding member into or out of the hollow, so that ease of insertion or removal of the holding member into or out of the hollow is improved.

Accordingly, an improved dust collection device is provided.

Other objects, features and advantages of the invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved dust collecting devices and method for using such dust collecting devices and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Representative Embodiment

Figure 1:
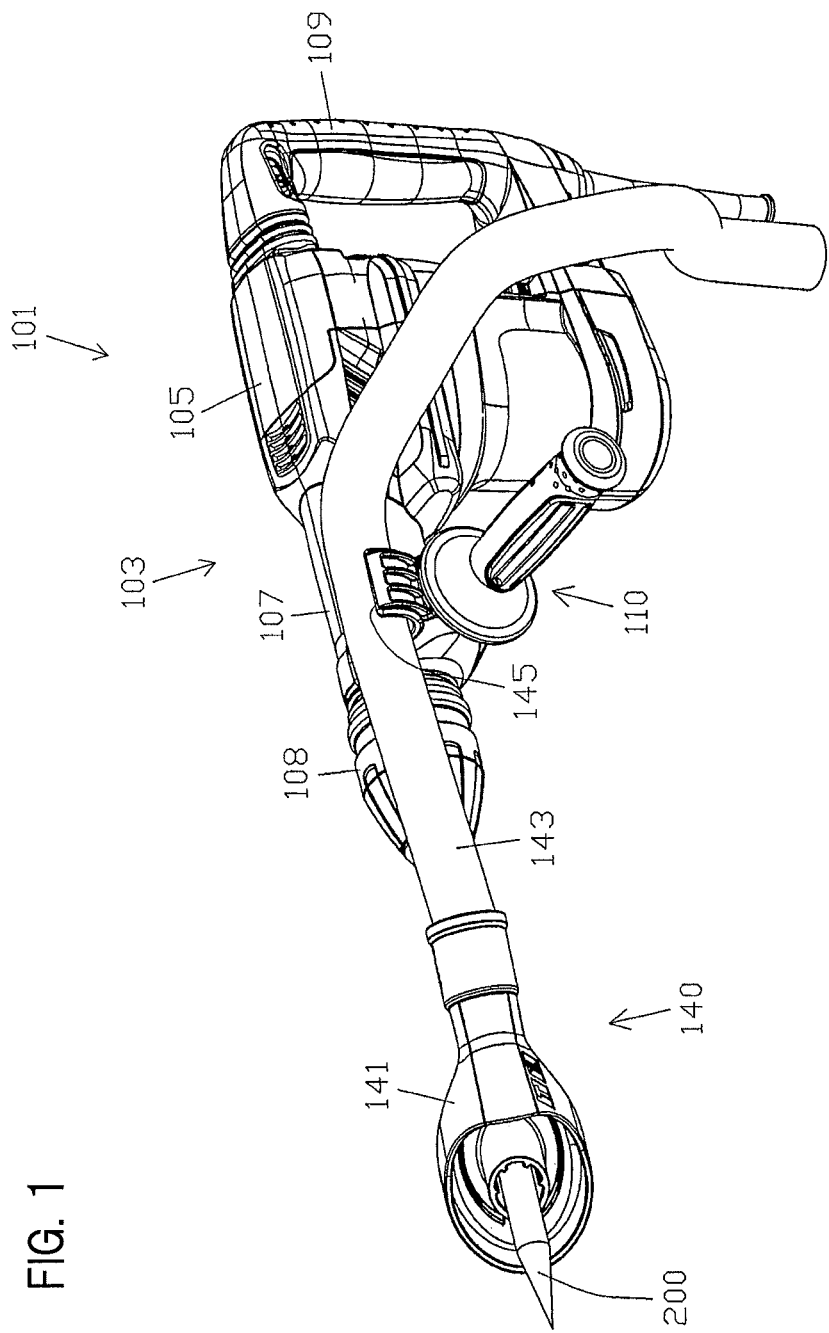
FIG. 1 is a perspective view showing an impact tool having a dust collecting device according to a first embodiment of the invention.

A first representative embodiment of the invention is now described with reference to FIGS. 1 to 11. The first embodiment is explained as being applied to an electric hammer which is a representative example of an impact tool having a dust collecting device according to this invention. As shown in FIG. 1, an auxiliary handle in the form of a side handle 110 and a dust collecting device 140 are attached to an electric hammer 101.

As shown in FIG. 1, the hammer 101 mainly includes a body 103 that forms an outer shell of the hammer 101, and a main handle in the form of a handgrip 109 connected to the body 103. Further, a hammer bit 200 is detachably coupled to a front (left as viewed in FIG. 1) end region of the body 103 via a tool holder (not shown). The body 103 and the hammer bit 200 are features that correspond to the "tool body" and the "tool bit", respectively, according to the invention.

The hammer bit 200 is held via a chuck 108 such that it is allowed to relatively reciprocate in the axial direction of the hammer bit 200 and prevented from relatively rotating in the circumferential direction around its axis relative to the tool holder. For the sake of convenience of explanation, the side of the front end to which the hammer bit 200 of the hammer 101 is coupled is taken as the front, and the side of the rear end on which the handgrip 109 is disposed is taken as the rear.

The body 103 mainly includes a housing 105 and a barrel 107. The barrel 107 is a generally cylindrical member disposed on a front of the housing 105. The body 103 houses a driving motor, a crank mechanism and a striking mechanism which are not shown. The crank mechanism is configured as a motion converting mechanism which converts rotation of the driving motor into liner motion. The striking mechanism mainly includes a striker which is moved in the axial direction of the hammer bit 200 by the crank mechanism, and an impact bolt which strikes the hammer bit 200 by transmitting movement of the striker to the hammer bit 200.

In the hammer 101 having the above-described construction, when the driving motor is driven, an impact force is applied in the axial direction from the crank mechanism to the hammer bit 200 via the striking mechanism. Thus, the hammer bit 200 performs an operation on a workpiece (for example, concrete) by hammering movement in the axial direction.

Figure 2:
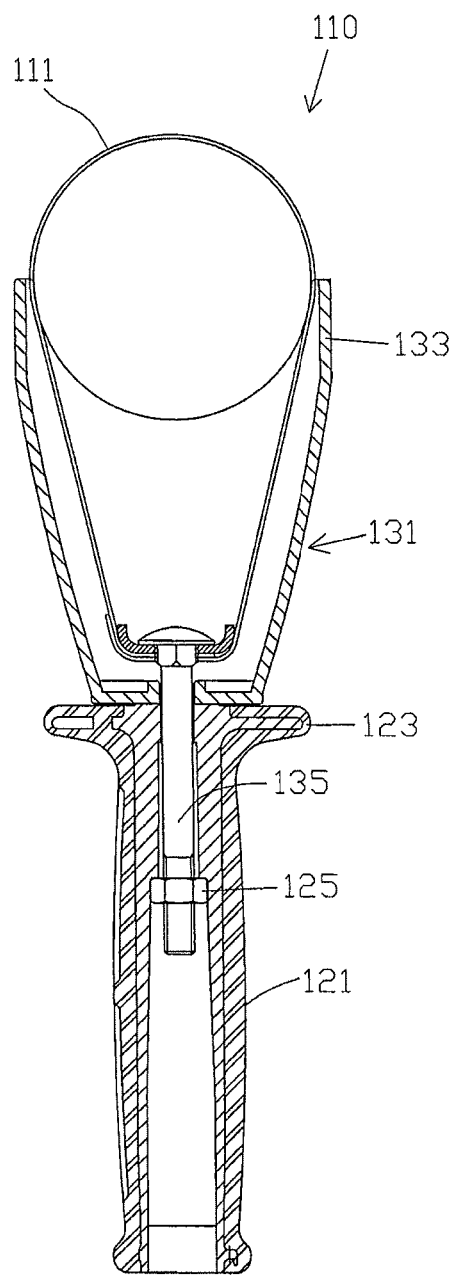
FIG. 2 is a sectional view of an auxiliary handle.

The auxiliary handle in the form of the side handle 110 is now described with reference to FIG. 2. The side handle 110 is removably attached to the barrel 107 of the hammer 101. The side handle 110 mainly includes a mounting ring 111, a grip 121 and a grip securing part 131. The side handle 110 is a feature that corresponds to the "auxiliary handle" according to the invention. The mounting ring 111, the grip 121 and the grip securing part 131 are features that correspond to the "mounting part", the "handle" and the "engagement part", respectively, according to the invention.

The mounting ring 111 is attached so as to surround the outer circumferential surface of the generally cylindrical barrel 107. The grip 121 is a rod-like member extending in a radial direction of the mounting ring 111 and configured to be held by a user. The grip 121 mainly includes a flange 123 formed on the mounting ring 111 side, and a nut 125 disposed inside the grip 121. The flange 123 is a feature that corresponds to the "flange" according to the invention.

The grip securing part 131 mainly includes a ring holder 133 which covers the outside of the mounting ring 111, and a bolt 135 connected to the mounting ring 111. By relative rotation of the grip 121 and the grip securing part 131 around the axis of the grip 121, the bolt 135 is screwed to the nut 125 so that the grip 121 and the grip securing part 131 move relative to each other in the longitudinal direction of the grip 121. In this manner, the mounting ring 111 and the ring holder 133 hold the barrel 107. Thus, the side handle 110 is attached to the body 103 of the hammer 101. The longitudinal direction of the grip 121 is a feature that corresponds to the "handle extending direction" according to the invention.

The dust collecting device 140 is now explained with reference to FIGS. 3 to 9. The dust collecting device 140 mainly includes a dust collecting hood 141 and a hose holder 145. The dust collecting hood 141 is formed of rubber, and the hose holder 145 is formed of resin. A dust collecting hose 143 is connected to the dust collecting hood 141 and held by the hose holder 145. The dust collecting hood 141, the dust collecting hose 143 and the hose holder 145 are features that correspond to the "dust collecting member", the "dust transferring member" and the "holding member", respectively, according to the invention.

Figure 3:
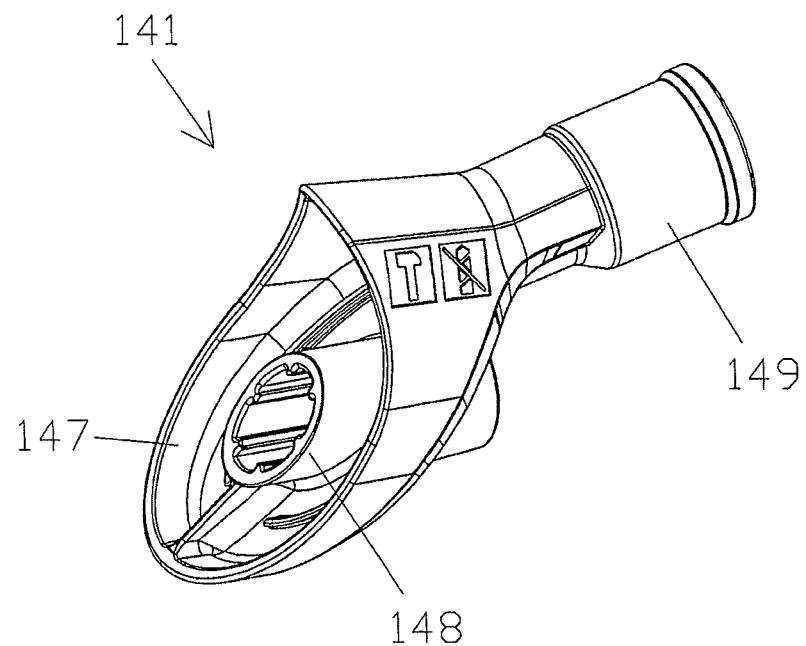
FIG. 3 is a perspective view of a dust collecting hood as viewed from the dust suction port side.
Figure 4:
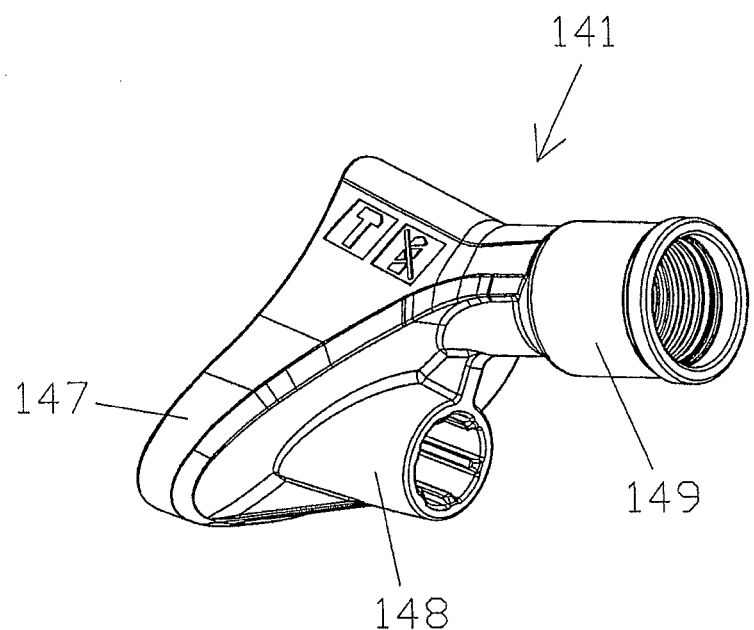
FIG. 4 is a perspective view of the dust collecting hood as viewed from the hose connecting part side.

As shown in FIGS. 3 and 4, the dust collecting hood 141 is a member for collecting dust generated during operation, and mainly includes a dust suction port 147, a hammer bit inserting part 148 and a hose connecting part 149. The dust suction port 147 is configured as a generally cup-like member having an opening on the front end of the dust collecting hood 141. The hammer bit inserting part 148 has a through hole through which the hammer bit 200 is inserted. The hose connecting part 149 is formed on the rear end of the dust collecting hood 141 on the side opposite to the dust suction port 147, and the dust collecting hose 143 is connected to the hose connecting part 149. The dust suction port 147 and the hose connecting part 149 are formed such that their internal spaces communicate with each other.

Figure 5:
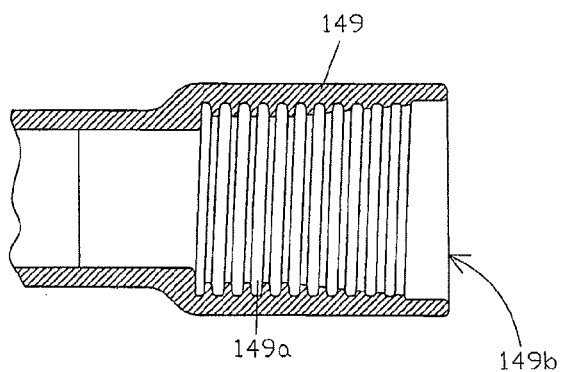
FIG. 5 is a sectional view of the hose connecting part.

As shown in FIG. 5, the hose connecting part 149 has a spiral engagement groove 149a in its inner wall. The engagement groove 149a is formed such that its depth increases from an opening 149b of the hose connecting part 149 toward the dust suction port 147. In other words, the inner wall of the hose connecting part 149 is tapered such that the inside diameter of the hose connecting part 149 decreases in a direction away from the opening 149b.

Figure 6:
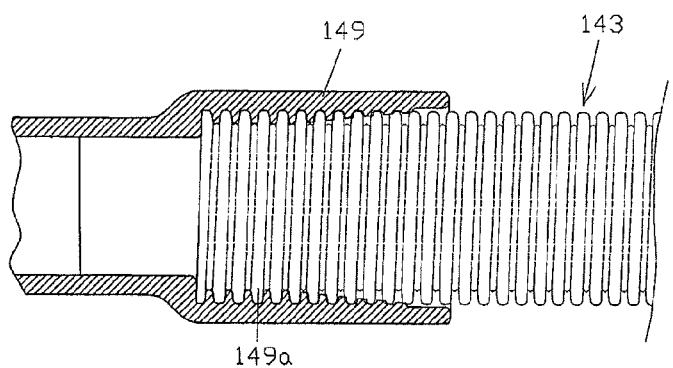
FIG. 6 is a sectional view for showing the state in which a dust collecting hose is connected to the hose connecting part.
Figure 7:
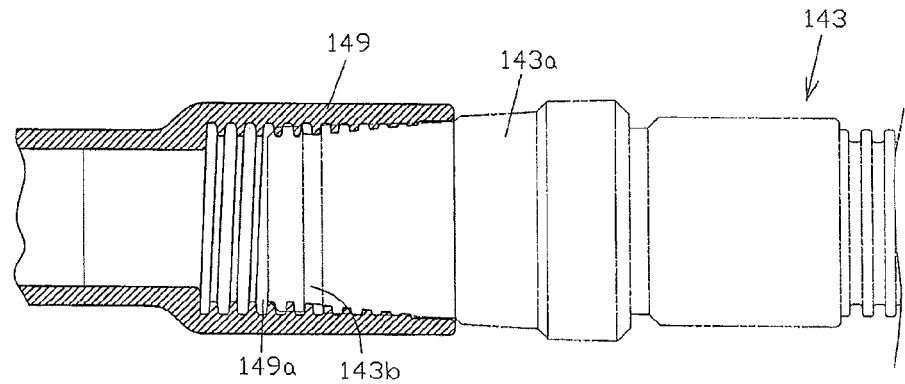
FIG. 7 is a sectional view for showing the state in which another dust collecting hose is connected to the hose connecting part.

As shown in FIG. 6, in the hose connecting part 149 having the spiral engagement groove 149a in its inner wall, an extensible dust collecting hose 143 having a spiral bellows is screwed in the engagement groove 149a, so that the dust collecting hose 143 is connected to the hose connecting part 149. Further, as shown in FIG. 7, due to the construction of the hose connecting part 149 having the tapered inner wall, the dust collecting hose 143 having a mounting member 143a (also referred to as a front cuff) with a tapered front end portion can also be connected to the hose connecting part 149. Further, a groove 143b is formed in the front end portion of the mounting member 143a and can be engaged with the engagement groove 149a. By such provision of the construction in which the spiral engagement groove 149a is formed in the inner wall of the hose connecting part 149 and the depth of the engagement groove 149a increases in a direction away from the opening 149b, several kinds of dust collecting hoses 143 can be selectively attached to the dust collecting hood 141.

Figure 8:
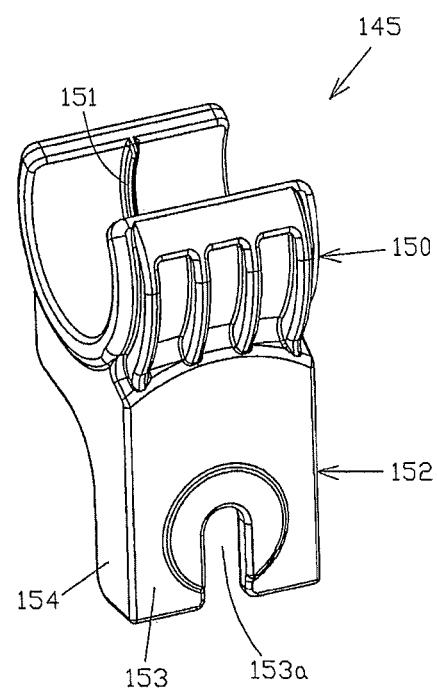
FIG. 8 is a perspective view of a hose holder.
Figure 9:
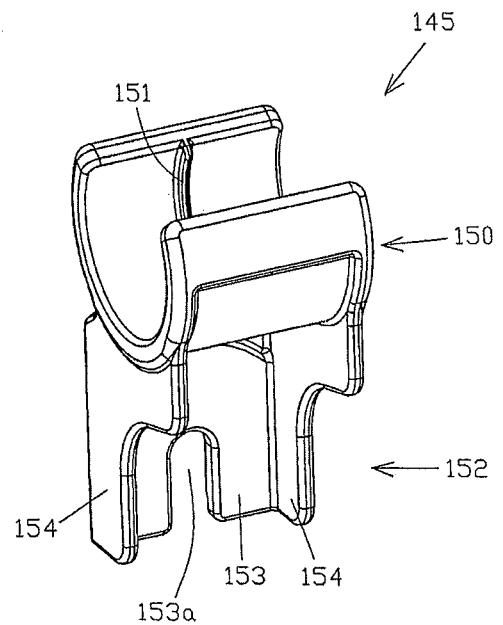
FIG. 9 is a perspective view of the hose holder.

As shown in FIGS. 8 and 9, the hose holder 145 has a hose engagement part 150 and a side-handle engagement part 152. The hose engagement part 150 is generally U-shaped to surround an outer periphery of the dust collecting hose 143. Further, an engagement rib 151 for engagement with the dust collecting hose 143 is formed generally in the middle of the hose engagement part 150 in its axial direction and extends in a direction crossing the axial direction of the hose engagement part 150. By engaging with the bellows of the dust collecting hose 143, the engagement rib 151 prevents the dust collecting hose 143 from moving in the extending direction of the dust collecting hose 143 and holds the dust collecting hose 143 with stability. The engagement rib 151 is a feature that corresponds to the "projection" according to the invention.

The side-handle engagement part 152 is held by the side handle 110 and has a clamping part 153 and a flange 154. The clamping part 153 has a notch 153a, and the bolt 135 of the side handle 110 is inserted in the notch 153*a*. The flange 154 is formed on each end of the clamping part 153 and extends vertically from the clamping part 153.

Figure 10:
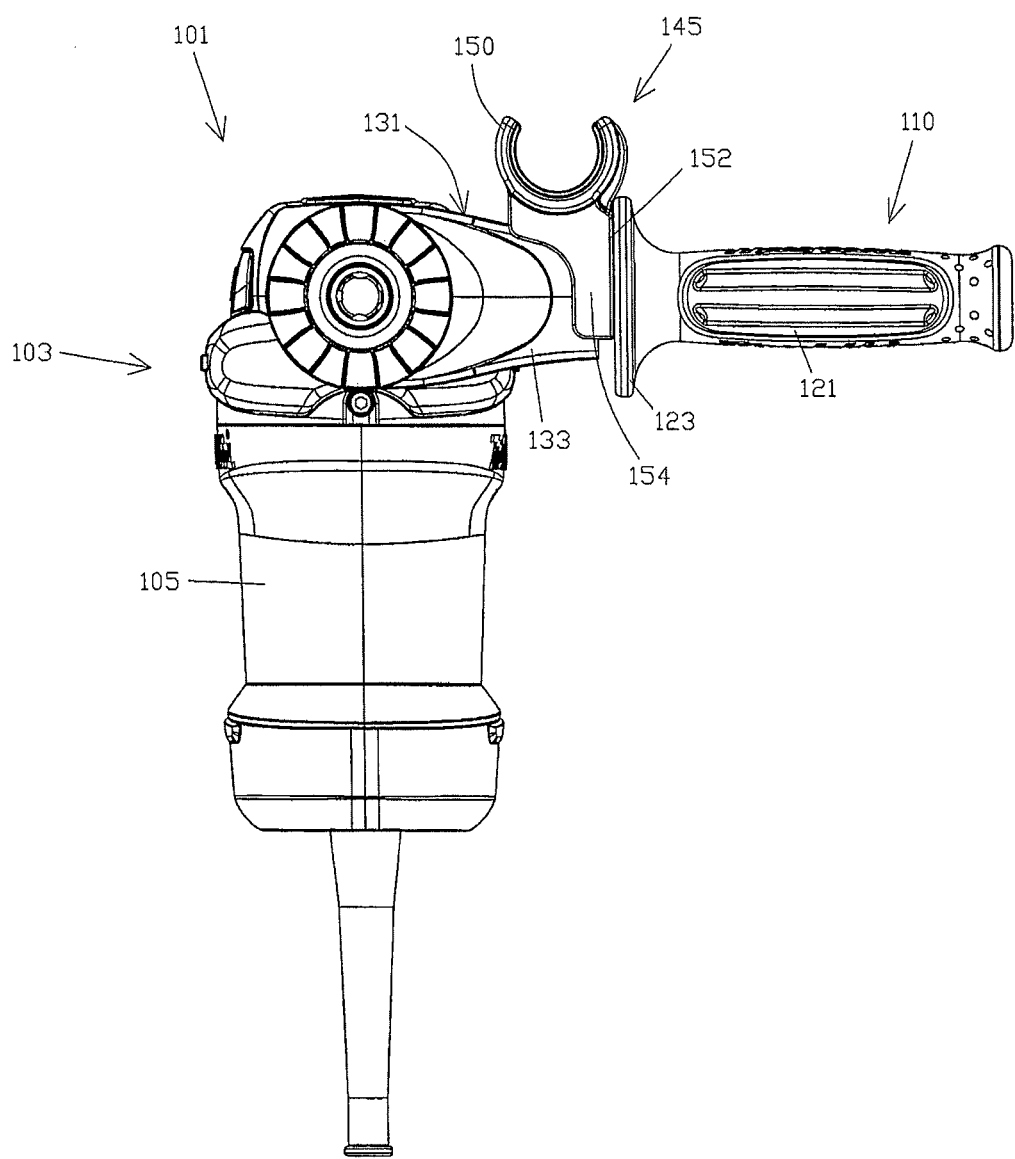
FIG. 10 is a front view showing an impact tool with the hose holder held thereon.
Figure 11:
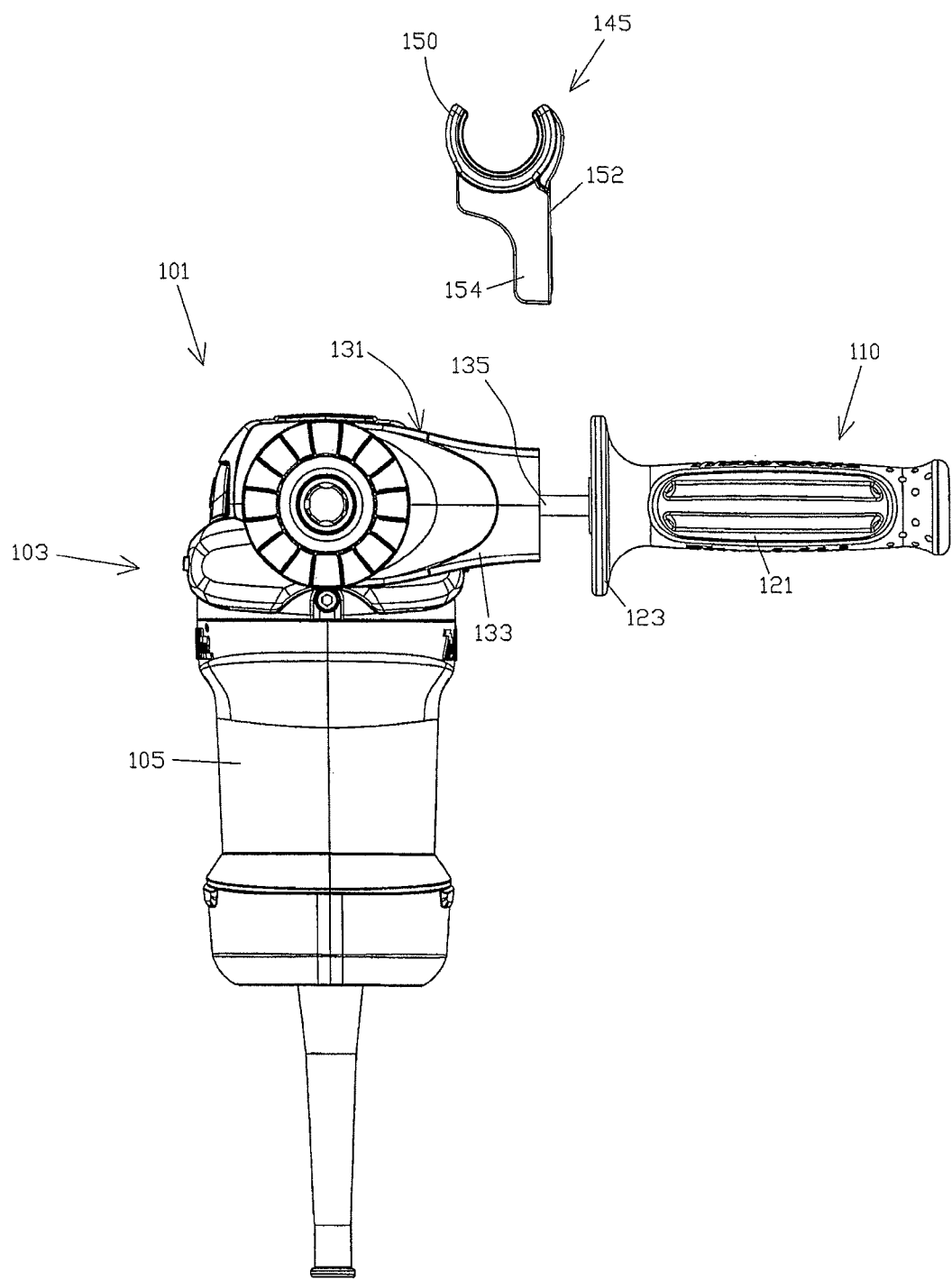
FIG. 11 is a front view showing the impact tool with the hose holder removed therefrom.

Next, the manner of attaching the hose holder 145 is explained with reference to FIGS. 10 and 11. The hose holder 145 is attached at the same time as the side handle 110 is attached to the body 103. Specifically, in order to attach the side handle 110 to the body 103, the grip 121 is turned around its axis in the state shown in FIG. 11, so that the bolt 135 is screwed in the nut 125. Thus, the grip 121 moves relative to the grip securing part 131. By turning the grip 121 until no gap remains between the grip 121 and the grip securing part 131, the grip 121 is secured to the grip securing part 131. Further, the outer side of the mounting ring 111 is engaged with the ring holder 133, so that the mounting ring 111 is fastened to the barrel 107 of the body 103. As a result, the side handle 110 is attached to the body 103.

In order to attach the hose holder 145, the hose holder 145 is set between the grip 121 and the grip securing part 131 when the side handle 110 is attached to the body 103. Specifically, as shown in FIG. 10, the bolt 135 is set in the notch 153*a* and the two flanges 154 are set to face the sides of the ring holder 133. Thereafter, by turning the grip 121 around its axis, the clamping part 153 is clamped between the flange 123 and the grip securing part 131. Thus, the hose holder 145 is held between the grip 121 and the grip securing part 131. Further, when the bolt 135 is screwed in the nut 125 by turning the grip 121 around its axis, the flanges 154 contact with the sides of the ring holder 133, so that the hose holder 145 is prevented from rotating around the axis of the grip 121.

As described above, the dust collecting device 140 is attached to the hammer 101 by attaching the hose holder 145 to the side handle 110 and inserting the hammer bit 200 through the hammer bit inserting part 148 of the dust collecting hood 141. The dust collecting hood 141 and the hose holder 145 are attached to the hammer 101, and in this state, the front end of the dust collecting hose 143 is connected to the hose connecting part 149 of the dust collecting hood 141, and a middle part of the dust collecting hose 143 is engaged with the hose engagement part 150 of the hose holder 145. In this manner, as shown in FIG. 1, the dust collecting hose 143 is attached to the hammer 101. Further, by engaging the engagement rib 151 of the hose engagement part 150 with the bellows of the dust collecting hose 143, the dust collecting hose 143 is prevented from moving in its extending direction. The rear end of the dust collecting hose 143 is connected to a suction device in the form of a dust collector (not shown).

According to the above-described first embodiment, the hose holder 145 is held by moving the grip 121 relative to the grip securing part 131 in order to secure the side handle 110 on the barrel 107. Specifically, the hose holder 145 is attached by a relative movement of the grip 121 to the grip securing part 131 in order to attach the side handle 110 to the body 103. Thus, the operation of attaching the hose holder 145 can be simplified. Particularly, in such a construction in which the side handle 110 having the bar-type grip 121 is attached to the hammer 101, the hose holder 145 can be attached in a rational manner. In this case, by provision of the grip 121 having the flange 123, the flange 123 abuts against the clamping part 153 so that the hose holder 145 is held with more stability.

Further, according to the first embodiment, as the hose holder 145 includes the flange 154, the side-handle engagement part 152 is reinforced by the flange 154, and the hose holder 145 is prevented from rotating around the axis of the grip 121 by the flange 154 when the grip 121 is turned around the axis to screw the bolt 135 in the nut 125.

Further, according to the first embodiment, as the hose holder 145 includes the engagement rib 151, the hose engagement part 150 is reinforced by the engagement rib 151, and the dust collecting hose 143 engaged with the hose engagement part 150 is prevented from moving. Thus, the hose holder 145 can reliably and securely hold the dust collecting hose 143. Particularly, the hose holder 145 has only one engagement rib 151, which is especially advantageous in forming the resin hose holder 145.

Further, according to the first embodiment, with the construction in which the dust collecting hood 141 is held by the hammer bit 200 and the hose holder 145 is held by the side grip 110, the dust collecting device 140 can be held on the body 103 of the hammer 101 with stability.

In the above-described first embodiment, the electric hammer 101 in which the hammer bit 200 performs only hammering movement in the axial direction is described as a representative example of a power tool, but the power tool is not limited to the electric hammer. For example, this invention may also be applied to a hammer drill which is capable of switching between a hammering mode in which the hammer bit 200 performs hammering movement and a hammer drill mode in which the hammer bit 200 performs hammering movement and rotation around its axis.

Further, in the first embodiment, the grip 121 is described as moving relative to the grip securing part 131 by screwing the bolt 135 in the nut 125. However, it may be constructed, for example, such that the grip 121 moves relative to the grip securing part 131 by linearly sliding and the grip 121 is secured to the grip securing part 131 by this relative movement.

Further, in the first embodiment, one engagement rib 151 is provided as a movement preventing part, but, for example, a plurality of engagement ribs 151 may be provided. As the movement preventing part other than such projection(s), a magnetic force may be utilized to prevent the dust collecting hose 143 from moving.

Further, in the first embodiment, the side grip 110 is described as being attached to the body 103 via the mounting ring 111, but the mounting part is not limited to a ring-like member. The mounting part may have any shape via which the side grip 110 can be attached to the body 103. For example, the mounting part may comprise an engagement projection or recess which is engaged with part of the body 103.

Further, in the first embodiment, the engagement groove 149*a* is described as being spiral. However, for example, the dust collecting hose 143 is deformable and in a case in which the dust collecting hose 143 is attached to the hose connecting part 149 by utilizing deformation of the dust collecting hose 143, a plurality of grooves may be formed in the circumferential direction as the preventing part and arranged in parallel in a direction perpendicular to the axial direction of the hose connecting part 149.

Further, in the first embodiment, in order to attach the dust collecting hose 143, the dust collecting hose 143 is inserted into the hose connecting part 149, but, it may be constructed, for example, such that the dust collecting hose 143 is fitted onto the hose connecting part 149.

Further, in the first embodiment, the engagement groove 149*a* is formed as a movement preventing part, but the movement preventing part may be configured by utilizing a magnetic force to prevent the dust collecting hose 143 from moving.

Second Representative Embodiment

Figure 12:
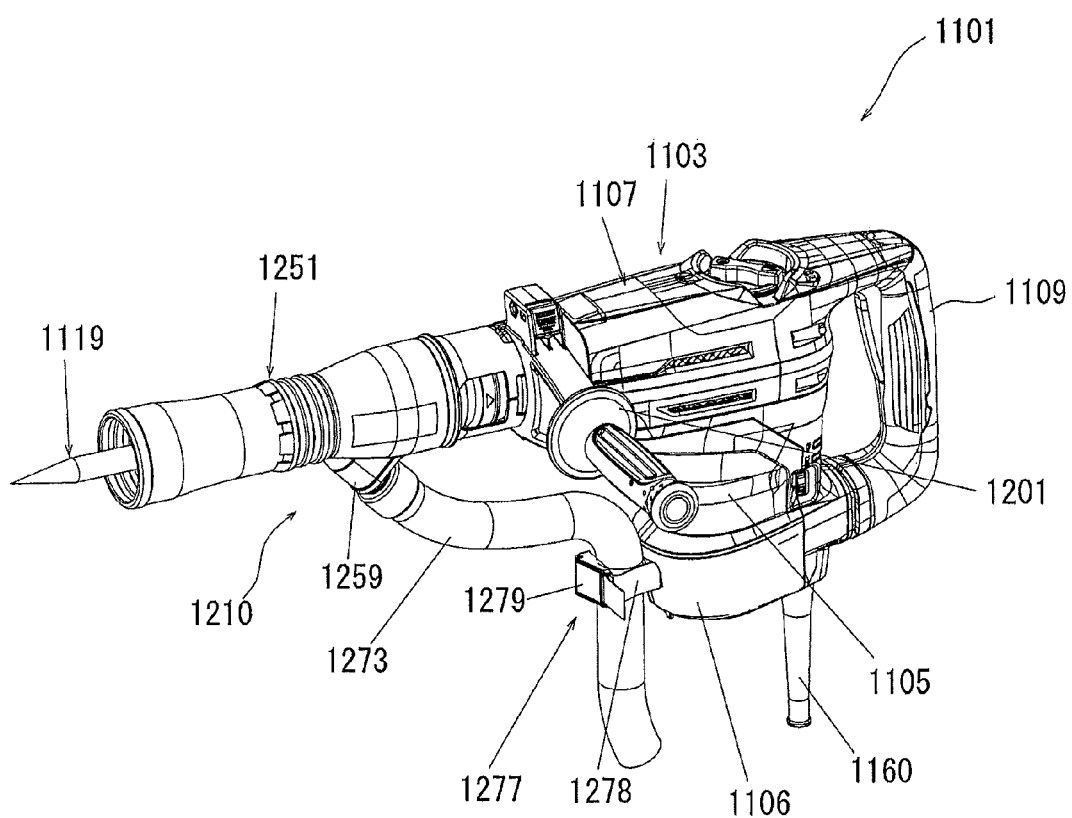
FIG. 12 is a perspective view showing an external appearance of a hammer drill with a dust collecting device according to a second embodiment of the invention.
Figure 13:
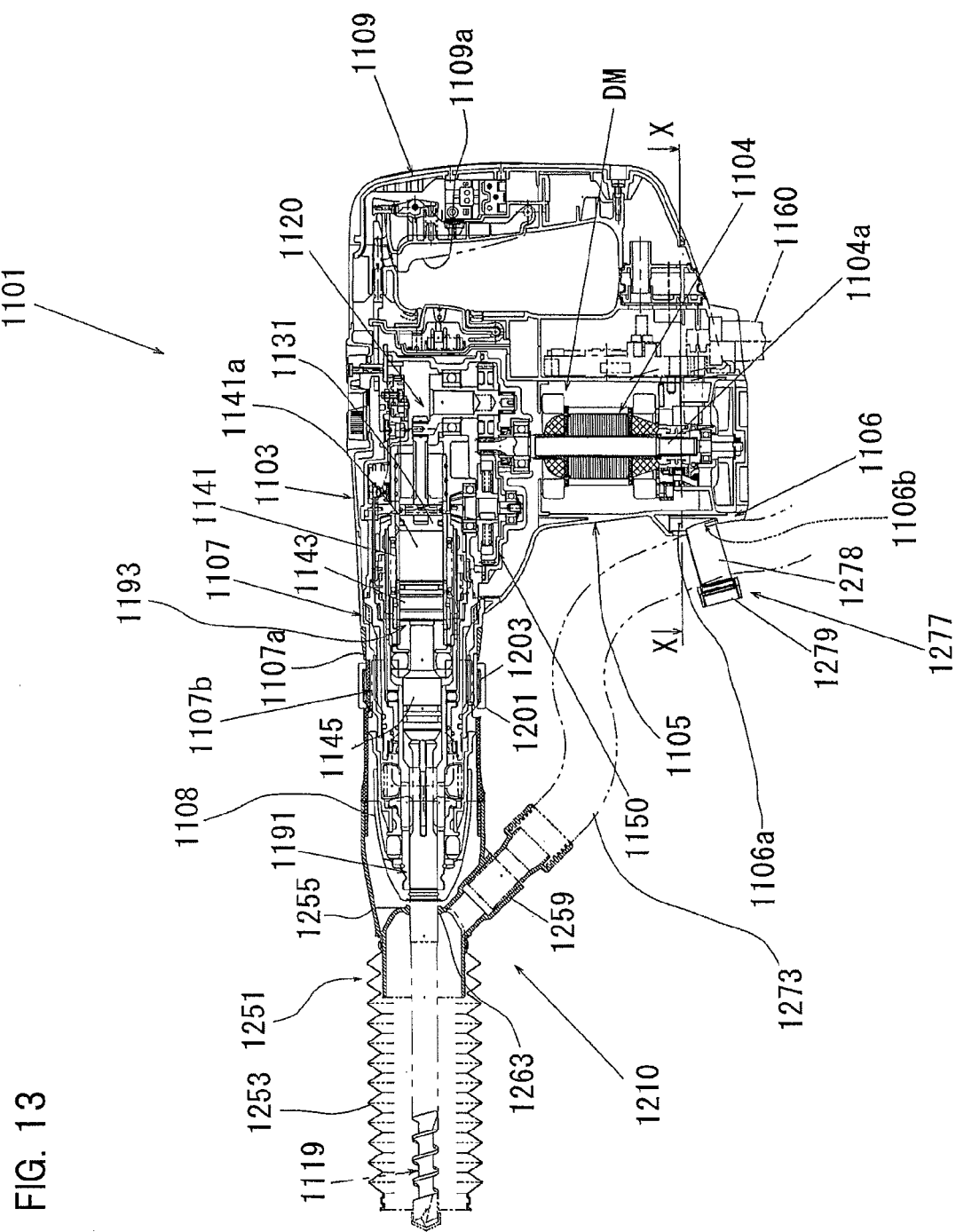
FIG. 13 is a sectional side view showing the entire structure of the hammer drill with the dust collecting device attached thereto.

A dust collecting device 210 according to a second representative embodiment of the invention is now described with reference to FIGS. 12 to 18. In the second embodiment, the dust collecting device 210 is explained as being applied to an electric hammer drill 1101 which is a representative example of a power tool. As shown in FIGS. 12 and 13, the hammer drill 1101 mainly includes a body 1103 that forms an outer shell of the hammer drill 1101, and a handgrip 1109 connected to the body 1103. Further, a hammer bit 1119 is coupled to a front (left as viewed in FIGS. 12 and 13) end region of the body 1103 on the side opposite to a region to which the handgrip 1109 is connected (on the right side as viewed in FIGS. 12 and 13). The hammer drill 1101, the body 1103 and the hammer bit 1119 are features that correspond to the "power tool", the "tool body" and the "tool bit", respectively, according to the invention. For the sake of convenience of explanation, the hammer bit 1119 side is taken as the front, and the handgrip 1109 side as the rear.

As shown in FIG. 13, the body 1103 mainly includes a driving motor 1104 having a motor shaft 1104a, a motion converting mechanism 1120 connected to the motor shaft 1104a, a power transmitting mechanism 1150 also connected to the motor shaft 1104a, a striking mechanism 1193 which makes an impact force on the hammer bit 1119, a motor housing 1105 that houses the driving motor 1104, a rear cover 1106 detachably mounted to the motor housing 1105, and a crank housing 1107 that houses the motion converting mechanism 1120, the striking mechanism 1193 and the power transmitting mechanism 1150. The motor housing 1105 is a feature that corresponds to the "tool body", the "housing" and the "motor housing" according to the invention, and the rear cover 1106 is a feature that corresponds to the "tool body", the "housing" and the "rear cover" according to the invention.

The driving motor 1104 is formed as a driving source for driving the hammer bit 1119. As shown in FIG. 13, the driving motor 1104 is configured as a direct-current electric motor with a brush and includes the motor shaft 1104a, a rotor, a stator and a brush 1104b. The driving motor 1104 is disposed within the motor housing 1105 such that an axis of the motor shaft 1104a crosses an axial direction of the hammer bit 1119. The driving motor 1104 is driven when the user pulls (manipulates) a trigger 1109a disposed on the handgrip 1109. The driving motor 1104, the motor shaft 1104a and the brush 1104b are features that correspond to the "motor", the "rotating shaft" and the "brush", respectively, according to the invention.

As shown in FIG. 13, the motion converting mechanism 1120 is mainly formed by a crank mechanism. The motion converting mechanism 1120 converts rotation of the motor shaft 1104a by the driving motor 1104 into liner motion of a piston 1131. The piston 1131 is one element of the crank mechanism and disposed within a cylinder 1141 such that it can slide in the axial direction of the hammer bit 1119. Pressure of an air chamber 1141a fluctuates with sliding movement of the piston 1131.

As shown in FIG. 13, the power transmitting mechanism 1150 mainly includes a plurality of gears (two pairs of gears) and reduces the rotation speed of the driving motor 1104 and then transmits torque of the driving motor 1104 to the hammer bit 1119.

As shown in FIG. 13, the striking mechanism 1193 mainly includes a striker 1143 and an impact bolt 1145. The striking mechanism 1193 is configured to cause the striker 1143 to strike the impact bolt 1145 and then transmit a striking force caused by the striking to the hammer bit 1119 via the impact bolt 1145. The striker 1143 is configured as a striking element that is slidably disposed within a bore of the cylinder 1141. The striker 1143 is driven via pressure fluctuations of the air chamber 1141a by sliding movement of the piston 1131. The impact bolt 1145 is configured as an intermediate element that transmits kinetic energy of the striker 1143 to the hammer bit 1119. The impact bolt 1145 is slidably disposed within a tool holder 1191.

As shown in FIG. 13, the motor housing 1105 is configured as a casing that houses the driving motor 1104. The motor housing 1105 has a cylindrical shape, and the motor housing 1105 is arranged so that an axis of the cylindrical shape is parallel to the axis of the motor shaft 1104a.

As shown in FIG. 13, the rear cover 1106 is configured as a generally cylindrical covering with a bottom and covers the driving motor 1104 at a lower end of the motor housing 1105. The rear cover 1106 is fitted onto the lower end (bottom as viewed in FIG. 13) of the motor housing 1105 and then fastened by fastening means such as mounting screws. The rear cover 1106 is detachably mounted to the motor housing 1105 for replacement of the brush 1104b of the driving motor 1104. Thus, the rear cover 1106 is detached from the motor housing 1105 in order to replace the brush 1104b (see FIGS. 17 and 18). Further, as shown in FIG. 12, for ease of detaching/mounting of the rear cover 1106 to the motor housing 1105, no other member is disposed around the rear cover 1106.

As shown in FIG. 13, a pocket-like space 1106a is formed on the inner side (the driving motor 1104 side) of a front (left as viewed in FIG. 13) wall of the rear cover 1106. The space 1106a has an open upper end (top as viewed in FIG. 13). The space 1106a is created by hollowing out a part of the rear cover 1106 which is provided for securing its rigidity, in order to realize weight reduction.

Figure 14:
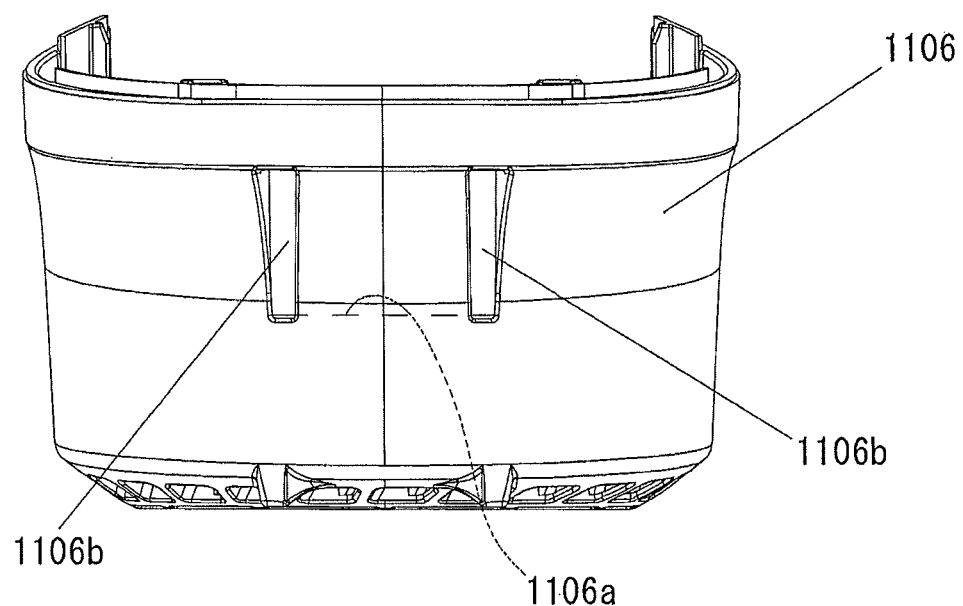
FIG. 14 is a front view of a rear cover as viewed from the front of the hammer drill.

As shown in FIGS. 13 and 14, two through holes 1106b are formed in an area of the front wall of the rear cover 1106 which is in a blind spot when viewed from behind (the handgrip 1109 side, the right side as viewed in FIG. 13) in the axial direction of the hammer bit 1119. Specifically, the through holes 1106b are formed in a region which is out of user's line of vision when viewed from the user side during operation. As shown in FIG. 13, the through holes 1106b are formed through the rear cover 1106 to extend from its outer surface into the space 1106a and do not communicate with an internal space of the motor housing 1105 (where the driving motor 1104 is disposed). Further, as shown in FIG. 14, the through holes 1106b are formed in the front wall of the rear cover 1106 in parallel to each other in the horizontal direction (a direction generally perpendicular to the axial direction of the hammer bit 1119 and the axial direction of the motor shaft 1104a, the horizontal direction as viewed in FIG. 14). Further, the through holes 1106b are extended in the vertical direction (the axial direction of the motor shaft 1104a, the vertical direction as viewed in FIGS. 13 and 14). The space 1106a and the through holes 1106b are features that correspond to the "tool body inside" and the "hollow" according to the invention.

As shown in FIG. 13, the axial direction of the crank housing 1107 is parallel to the axial direction of the hammer bit 1119. Therefore, the crank housing 1107 and the motor housing 1105 form a generally L-shaped body in a side view. A generally cylindrical barrel 1107a is formed on a front (left end as viewed in FIG. 13) of the crank housing 1107. A grip mounting part 1107b is formed on the barrel 1107a. An auxiliary handle in the form of a side grip 1201 is mounted on the grip mounting part 1107b. In FIG. 13, only a part of the side grip 1201 is shown. The tool holder 1191 is rotatably disposed in a front end (left end as viewed in FIG. 13) region of the crank housing 1107 in the axial direction. The hammer bit 1119 is detachably held by the tool holder 1191. Further, the cylinder 1141 is disposed behind the tool holder 1191 in the crank housing 1107. The inside of the cylinder 1141 is partitioned by the piston 1131 and the striker 1143 and forms an air chamber 1141a.

The hammer bit 1119 directly works on the workpiece. The hammer bit 1119 is inserted in a bit insertion hole of the tool holder 1191 and held by a chuck 1108 such that it is allowed to reciprocate in the axial direction and prevented from rotating in the circumferential direction.

The hammer drill 1101 thus constructed performs a hammer drill operation on a workpiece (for example, concrete) by the striking movement in the axial direction and rotation in the circumferential direction of the hammer bit 1119. Further, the hammer drill 1101 is switchable not only to the hammer drill mode for hammer drill operation, but to the hammering mode in which the hammer bit 1119 performs only striking movement.

A dust collecting device 1210 which is attached to the hammer drill 1101 constructed as described above is now explained. As shown in FIG. 13, the dust collecting device 1210 mainly includes a dust collecting cup 1251, a connecting hose 1273 that connects the dust collecting cup 1251 to a dust collector (not shown), and a binding band 1277 that fastens the connecting hose 1273 to the rear cover 1106. The dust collecting cup 1251, the connecting hose 1273 and the binding band 1277 are features that correspond to the "dust collecting member", the "dust transferring member" and the "holding member", respectively, according to the invention.

As shown in FIG. 13, the dust collecting cup 1251 has a generally cylindrical shape having both ends open and covers the hammer bit 1119 and a front end region of the body 1103. The dust collecting cup 1251 includes a bellows-like cup body 1253 which can expand and contract, and a cylindrical cup mounting part 1255 which is connected to one end (right end as viewed in FIG. 13) of the cup body 1253 in the axial direction. The dust collecting cup 1251 is mounted to the crank housing 1107 with the cup body 1253 in the front and the cup mounting part 1255 in the rear. In order to mount the dust collecting cup 1251 to the crank housing 1107, the cup mounting part 1255 is tightened by a mounting band 1203 of the side grip 1201, with the dust collecting cup 1251 fitted on the barrel 1107a. The mounting band 1203 is wrapped around the grip mounting part 1107b and tightened by using a threaded structure (not shown). Specifically, the dust collecting cup 1251 is fastened together with the side grip 1201 on the grip mounting part 1107b. By thus mounting the dust collecting cup 1251 onto the grip mounting part 1107b, the cup body 1253 covers the hammer bit 1119 and the cup mounting part 1255 covers the front end region of the body 1103.

Further, as shown in FIG. 13, the cup mounting part 1255 has a dust discharge nozzle 1259 and a sealing part 1263 formed in the vicinity of a connection with the cup body 1253. The dust discharge nozzle 1259 communicates with the internal space of the cup mounting part 1255. The dust discharge nozzle 1259 protrudes obliquely rearward (generally in a direction toward the rear cover 1106) from an outer surface of the cup mounting part 1255. The connecting hose 1273 for connection to a dust collector is connected to the dust discharge nozzle 1259. The sealing part 1263 is provided and formed to narrow a gap between the cup mounting part 1255 and a shank of the hammer bit 1119.

Figure 15:
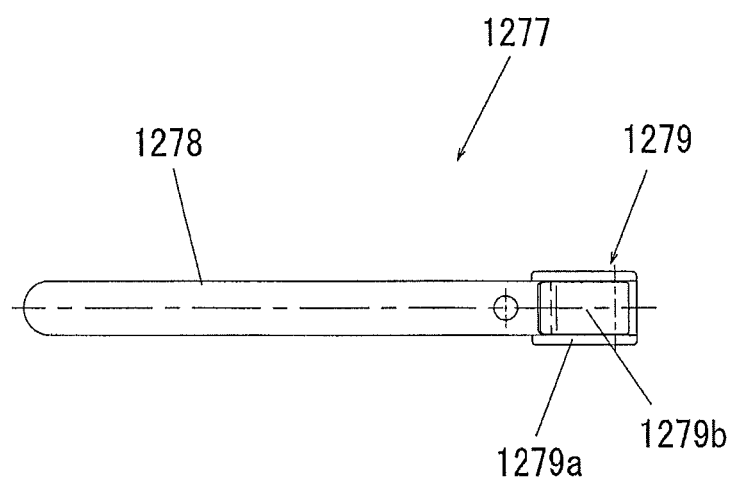
FIG. 15 is a plan view of a binding band.
Figure 16:
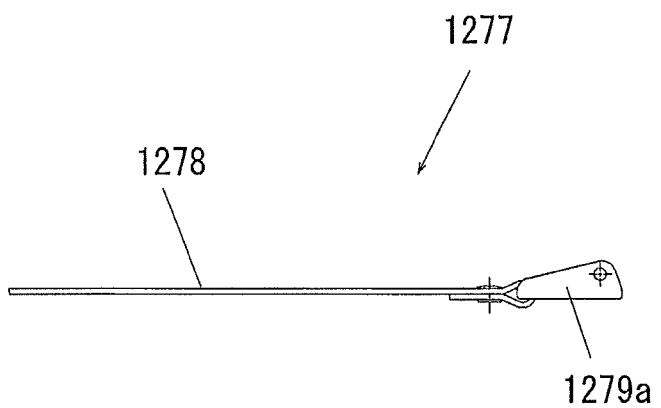
FIG. 16 is a side view of the binding band.

As shown in FIGS. 15 and 16, the binding band 1277 has a belt 1278 and a buckle 1279. The binding band 1277 is deformable. The belt 1278 is formed of a flexible material such as resin and cloth into an elongate form. The buckle 1279 is rotatably mounted to one end of the belt 1278. Further, the buckle 1279 has a base 1279a to which the belt 1278 is fixed, and a buckle plate 1279b which is rotatably mounted to the base 1279a.

As shown in FIGS. 15 and 16, in order to fasten the belt 1278 of the binding band 1277, in an open state of the buckle plate 1279b, the belt 1278 is inserted between the base 1279a and the opened buckle plate 1279b, and thereafter, the buckle plate 1279b is closed as a close state by rotating toward the base 1279a. On the other hand, the belt 1278 is loosened as the open state by rotating the buckle plate 1279b in the close state. The belt 1278, the buckle 1279, the close state of the buckle plate 1279b and the open state of the buckle plate 1279b are features that correspond to the "band", the "band locking part", the "locked state" and the "released state", respectively, according to the invention.

Operation of the hammer drill 1101 with the dust collecting device 1210 constructed as described above is now explained. In the following description, a hammer drill operation is taken as an example of operation on a workpiece. The hammer drill operation is performed with the hammer bit 1119 pressed against the workpiece. In the hammer drill operation, the workpiece is drilled by striking movement in the axial direction and rotation in the circumferential direction of the hammer bit 1119, and dust is generated by a drilling. The dust generated by the drilling is collected by the dust collecting cup 1251 and forcibly sucked by a dust collector through the dust discharge nozzle 1259 and the connecting hose 1273. In the hammer drill operation, if the connecting hose 1273 sways, it may interfere with the operation.

Therefore, as shown in FIG. 12, the connecting hose 1273 is fastened to the rear cover 1106 with the binding band 1277. The connecting hose 1273 is fastened to the rear cover 1106 in the following manner.

Figure 17:
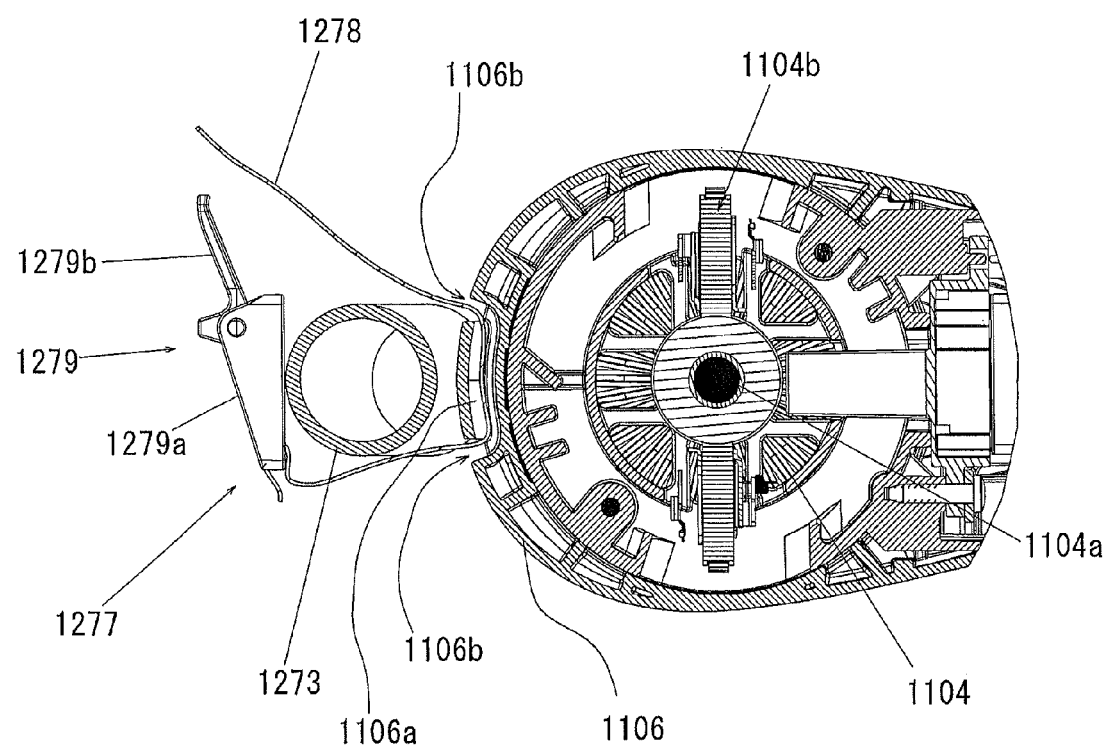
FIG. 17 is a view (sectional view taken along line X-X in FIG. 12) for schematically illustrating the manner of fastening a connecting hose to the rear cover with the binding band.
Figure 18:
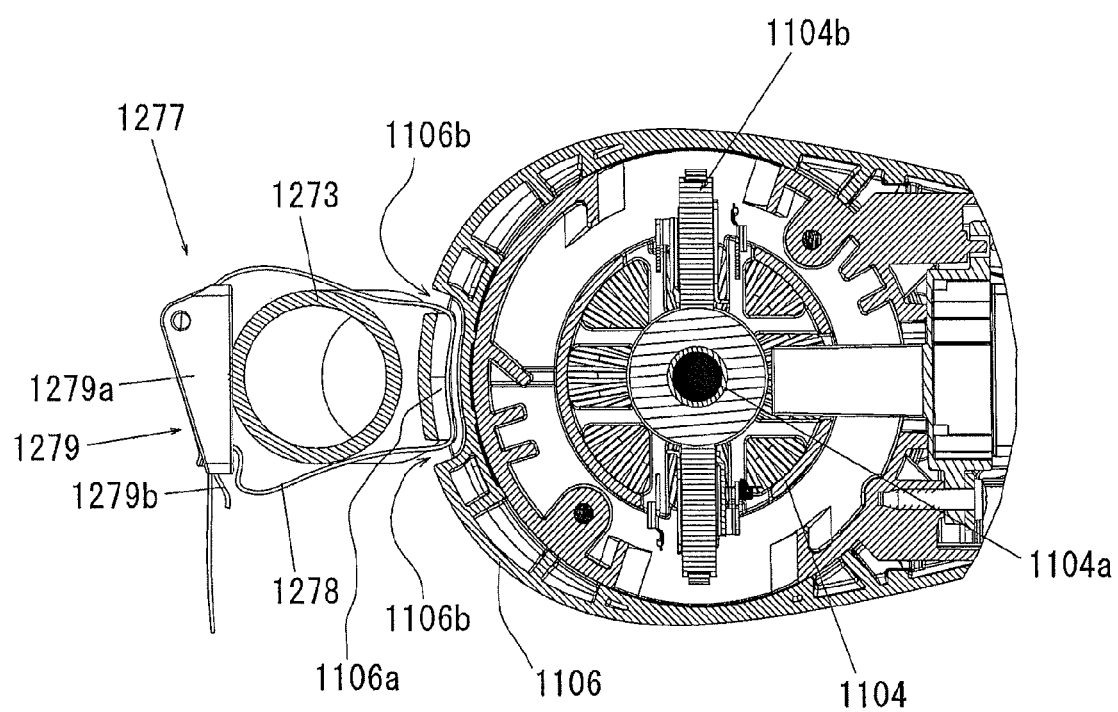
FIG. 18 is a view (sectional view taken along line X-X in FIG. 12) for schematically illustrating the manner of fastening the connecting hose to the rear cover with the binding band.

First, as shown in FIG. 17, the belt 1278 is inserted from one to the other of the through holes 1106b. Then, the belt 1278 and the buckle 1279 are arranged to surround the connecting hose 1273, and the belt 1278 is inserted between the base 1279a and the buckle plate 1279b in the open state of the buckle plate 1279b. Then, as shown in FIG. 18, the belt 1278 is tightened to such an extent that the connecting hose 1273 does not interfere with the hammer drill operation, and the buckle plate 1279b is closed. Thus, the connecting hose 1273 is fastened to the rear cover 1106. At this time, the binding band 1277 engages with the connecting hose 1273 by conforming to the outer surface of the connecting hose 1273, so that it can effectively restrain movement of the connecting hose 1273. Further, the buckle 1279 is provided on the front end of the connecting hose 1273.

On the other hand, in order to release the connecting hose 1273 from the rear cover 1106, as shown in FIG. 17, the buckle plate 1279b is opened to release the belt 1278, and then the belt 1278 is pulled out from between the base 1279a and the buckle plate 1279b. Any member which may interfere with insertion of the binding band 1277 through the through holes 1106b is not disposed around the rear cover 1106, so that the binding band 1277 is easily inserted or removed through the through holes 1106b. Further, even when the dust collecting cup 1251 and the connecting hose 1273 are not used, the binding band 1277 may be left attached to the rear cover 1106 through the through holes 1106b, so that the risk of loss of the binding band 1277 is reduced. Further, when the hammer drill 1101 is not used, the binding band 1277 may be used to fasten a rolled-up power cord 1160 to the rear cover 1106.

As described above, in the dust collecting device 1210 according to the second embodiment, as shown in FIG. 12, the connecting hose 1273 is fastened to the rear cover 1106 by the binding band 1277, so that the connecting hose 1273 is prevented from swaying and thus interfering with the hammer drill operation. Moreover, with the construction in which the binding band 1277 is inserted through the through holes 1106*b* and thus mounted to the rear cover 1106, the binding band 1277 itself is also prevented from interfering with the hammer drill operation. Further, with the construction in which the connecting hose 1273 and the binding band 1277 are disposed in an area of the front wall of the rear cover 1106 which is in a blind spot (which is out of user's line of vision) during hammer drill operation, the connecting hose 1273 and the binding band 1277 is prevented from entering the user's field of vision. As a result, a decrease in workability during hammer drill operation is more effectively prevented.

Further, as shown in FIGS. 17 and 18, the connecting hose 1273 is easily attached to and removed from the rear cover 1106 by operating the buckle 1279. Further, the binding band 1277 is inserted through the two through holes 1106*b*, so that a large engagement margin is provided for the binding band 1277 to be engaged and attached to the rear cover 1106. Therefore, the connecting hose 1273 is fastened to the rear cover 1106 with stability. Further, in the front wall of the rear cover 1106, only the through holes 1106*b* are formed, and an unnecessary projection or the like is not formed. Therefore, such construction prevents occurrence of interference with the hammer drill operation even when the dust collecting cup 1251 and the connecting hose 1273 are not used.

According to the above-described second embodiment, with the construction in which the two through holes 1106*b* are formed in the front wall of the rear cover 1106 and the connecting hose 1273 is fastened to the rear cover 1106 with the binding band 1277 through the through holes 1106*b*, the binding band 1277 itself is prevented from interfering with the hammer drill operation. As a result, a decrease in workability during hammer drill operation is prevented.

Further, according to the second embodiment, with the construction in which the through holes 1106*b* do not communicate with the internal space of the motor housing 1105, dust and dirt is effectively prevented from entering the internal space.

Further, according to the second embodiment, the through holes 1106*b* are formed in an area of the front wall of the rear cover 1106 which is in a blind spot (which is out of user's line of vision when viewed from the user side) during hammer drill operation, and the connecting hose 1273 and the binding band 1277 are disposed in this region. With this construction, the connecting hose 1273 and the binding band 1277 are prevented from entering user's field of vision. As a result, a decrease in workability during hammer drill operation is more effectively prevented. Further, any member which may interfere with insertion of the binding band 1277 through the through holes 1106*b* is not disposed around the rear cover 1106, so that the binding band 1277 is easily inserted and removed through the through holes 1106*b*.

Further, according to the second embodiment, with the construction in which the through holes 1106*b* are formed in the rear cover 1106 around which other member is not disposed, the binding band 1277 is easily inserted and removed through the through holes 1106*b*. Thus, ease of insertion and removal of the binding band is improved.

In the second embodiment, the binding band 1277 is described as being attached to the rear cover 1106 by inserting the belt 1278 of the binding band 1277 through the through holes 1106*b*. In order to attach the binding band 1277 to the rear cover 1106, however, a member having an engagement part may be integrally formed with the binding band and the engagement part may be engaged with the through holes 1106*b*. In this case, the member having the engagement part and the binding band 1277 is a feature that corresponds to the "fastening member" according to the invention. The engagement part is a feature that corresponds to the "projection" according to the invention.

Figure 19:
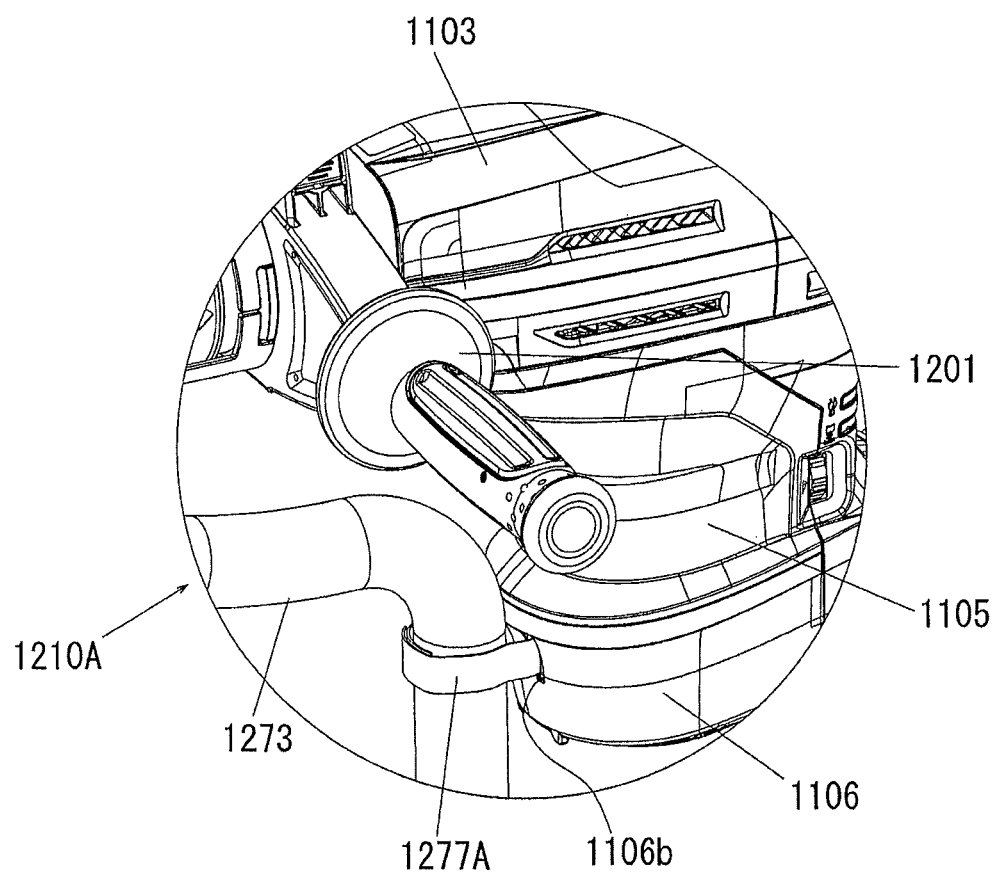
FIG. 19 is an enlarged view showing an essential part where the connecting hose of a modified dust collecting device is fastened to the tool body.

Further, in the second embodiment, the binding band 1277 is used to fasten the connecting hose 1273 to the rear cover 1106, but any other structure may be used which can fasten the connecting hose 1273 to the rear cover 1106 by inserting through the through holes 1106*b* and wrapping around the connecting hose 1273. For example, like a variation of a dust collecting device 1210A shown in FIG. 19, a hook-and-loop fastener 1277A may be used to fasten the connecting hose 1273 to the rear cover 1106. In this case, the hook-and-loop fastener 1277A is a feature that corresponds to the "fastening member" according to the invention.

Third Representative Embodiment

Figure 20:
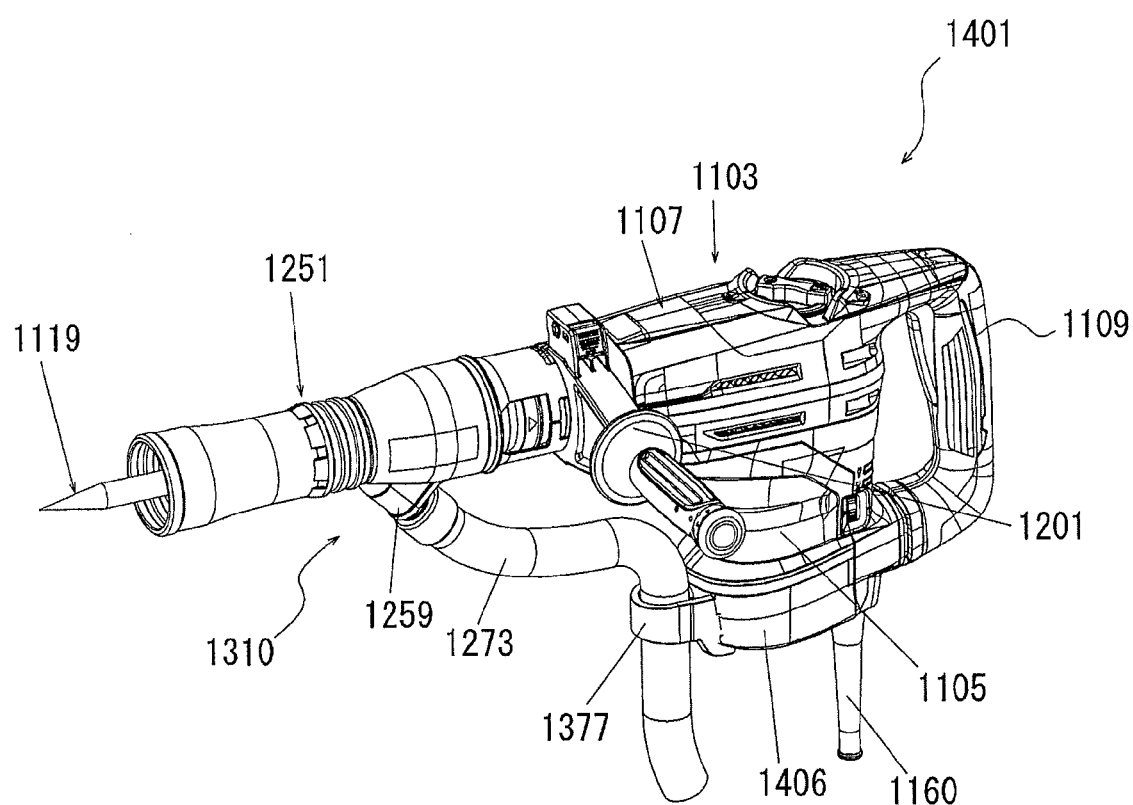
FIG. 20 is a perspective view showing an external appearance of a hammer drill with a dust collecting device according to a third representative embodiment of the invention.

A dust collecting device 1310 according to a third representative embodiment of the invention is now described with reference to FIGS. 20 to 24. As shown in FIG. 20, a hammer drill 1401 has the same construction as the hammer drill 1101 described in the second embodiment except a rear cover 1406. Further, the dust collecting device 1310 has the same construction as the dust collecting device 1210 described in the second embodiment except a hose holder 1377. Specifically, in the hammer drill 1401 with the dust collecting device 1310, the hose holder 1377 is used to fasten the connecting hose 1273 to the rear cover 1406. Therefore, components or elements in the third embodiment which are substantially identical to those in the second embodiment are given like numerals as in the second embodiment and is not described.

Figure 21:
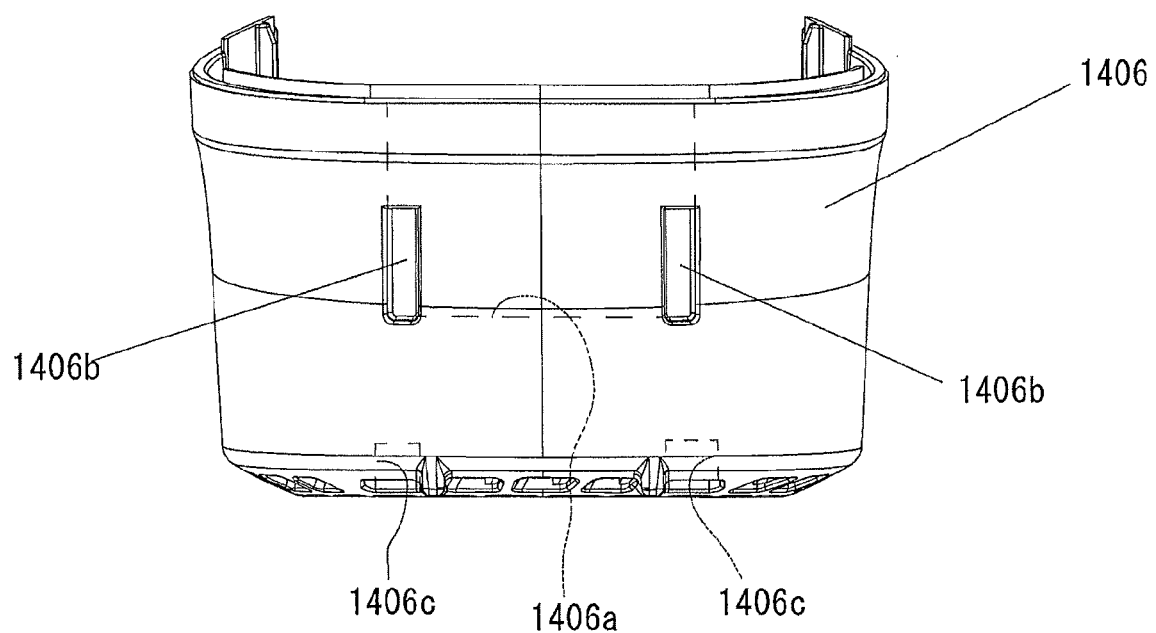
FIG. 21 is a front view of a rear cover as viewed from the front of the hammer drill.
Figure 23:
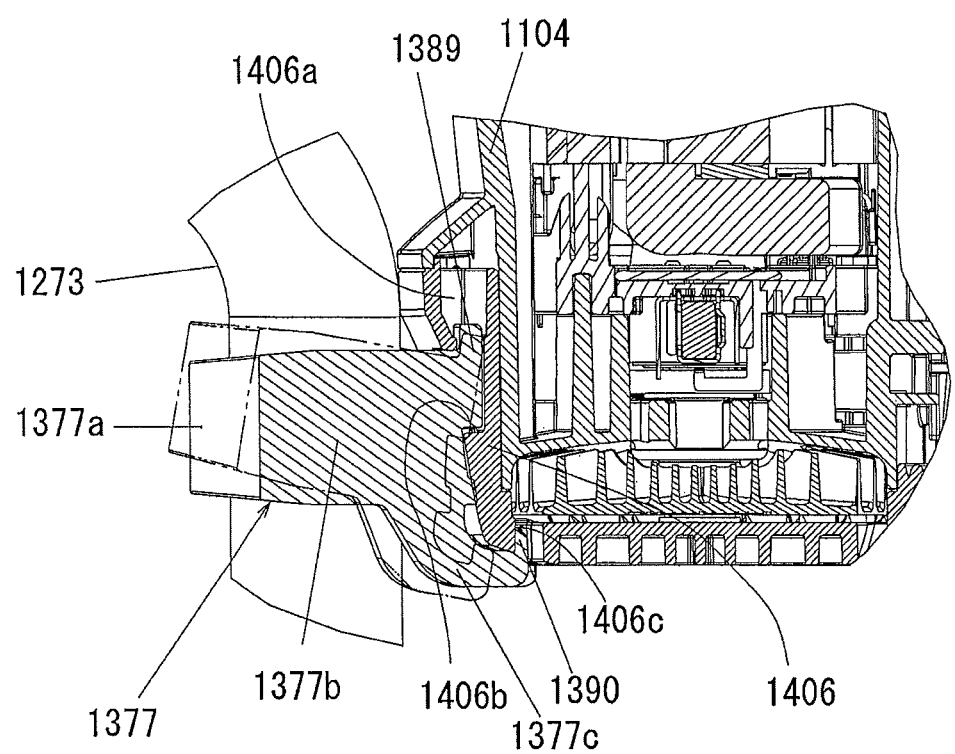
FIG. 23 is a sectional view showing the manner of mounting a hose holder to the rear cover.

As shown in FIGS. 21 and 23, in the rear cover 1406 of the hammer drill 1401, a pocket-like space 1406*a* is formed on the inner side of a front (left as viewed in FIG. 23) wall of the rear cover 1406. Further, two through holes 1406*b* are formed in an area of the front wall of the rear cover 1406 which is in a blind spot when viewed from behind (the handgrip 1109 side, the right side as viewed in FIG. 20) in the axial direction of the hammer bit 1119. Specifically, the through holes 1406*b* are formed in a region which is out of user's line of vision when viewed from the user side during hammer drill operation. The space 1406*a* and the through holes 1406*b* have the same construction as the space 1106*a* and the through holes 1106*b*, and therefore, their detailed description is omitted.

Figure 22:
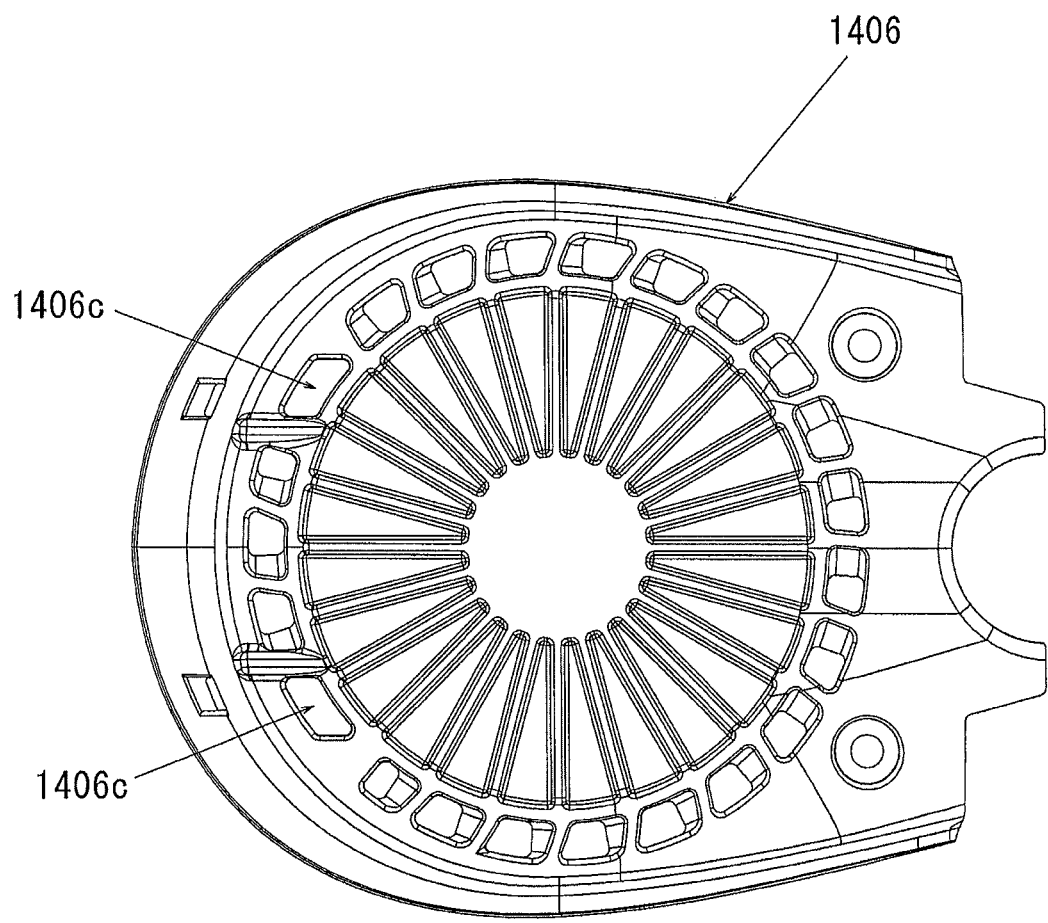
FIG. 22 is a bottom view of the rear cover as viewed from below.

As shown in FIG. 22, two recesses 1406*c* are formed in an outer surface of the bottom of the rear cover 1406 and arranged right and left (vertically as viewed in FIG. 22) in parallel. As shown in FIG. 20, for ease of removal and mounting of the rear cover 1406, no other member is disposed around the rear cover 1406. The rear cover 1406 is a feature that corresponds to the "tool body", the "housing" and the "rear cover" according to the invention. The space 1406*a* and the through holes 1406*b* and recesses 1406*c* are features that correspond to the "tool body inside" and the "hollow", respectively, according to the invention.

Figure 24:
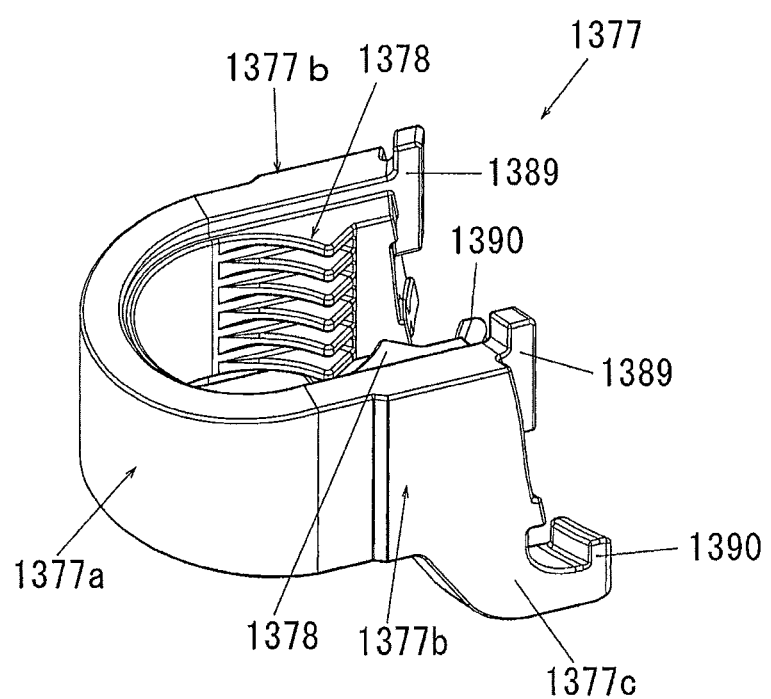
FIG. 24 is a perspective view showing an external appearance of the hose holder.

The hose holder 1377 is formed, for example, of flexible resin. As shown in FIG. 24, the hose holder 1377 has a generally U-shaped section which is perpendicular to the height direction of the hose holder 1377 (the vertical direction as viewed in FIG. 24). Specifically, the hose holder 1377 includes a U-shaped bottom 1377a and two U-shaped arms 1377b. The U-shaped bottom 1377a has an inner circumferential surface which surrounds the connecting hose 1273, and has an inner diameter substantially equal to or slightly larger than the outer diameter of the connecting hose 1273. The two U-shaped arms 1377b are formed contiguously to the U-shaped bottom 1377a and extend in parallel to each other in a direction away from the U-shaped bottom 1377a (to the right as viewed in FIG. 24) in the direction of the tangent to the U-shaped bottom 1377a. Further, inwardly projecting ribs 1378 are formed on an inner circumferential surface of each of the U-shaped arms 1377b. The projecting ribs 1378 have a concave surface which conforms to the outer surface of the connecting hose 1273. The connecting hose 1273 is more reliably and securely restrained by the inner circumferential surface of the U-shaped bottom 1377a and the concave surfaces of the projecting ribs 1378. The hose holder 1377 is a feature that corresponds to the "holding member" according to the invention.

Further, as shown in FIG. 24, an upper engagement claw 1389 and a lower engagement claw 1390 are formed in pair on each of the U-shaped arms 1377b. The upper engagement claw 1389 and the lower engagement claw 1390 protrude upward in the height direction of the hose holder 1377 (upward as viewed in FIG. 24).

As shown in FIG. 24, the upper engagement claw 1389 is formed on a front end (right end as viewed in FIG. 24) of the U-shaped arm 1377b on the side opposite to the U-shaped bottom 1377a in the extending direction of the U-shaped arm 1377b and on an upper end (upper end as viewed in FIG. 24) of the U-shaped arm 1377b in the height direction of the hose holder 1377. Further, the upper engagement claw 1389 protrudes upward from the upper end surface of the U-shaped arm 1377b.

As shown in FIG. 24, the lower engagement claw 1390 is formed on a front end (right end as viewed in FIG. 24) of the U-shaped arm 1377b in the extending direction of the U-shaped arm 1377b and on a lower end (lower end as viewed in FIG. 24) of the U-shaped arm 1377b in the height direction of the hose holder 1377. Specifically, the lower engagement claw 1390 is formed on an extending part 1377c which is formed on the lower end of the U-shaped arm 1377b and L-shaped in side view. The extending part 1377c extends a predetermined distance downward from the lower end of the U-shaped arm 1377b in the height direction of the hose holder 1377 and then extends in a direction away from the U-shaped bottom 1377a (to the right as viewed in FIG. 24) in the extending direction of the U-shaped arm 1377b. The lower engagement claw 1390 is formed on the front end of the extending part 1377c on the side opposite to the U-shaped bottom 1377a in the extending direction of the extending part 1377c. The upper engagement claw 1389 and the lower engagement claw 1390 are features that correspond to the "projection" according to the invention.

The manner of fastening the connecting hose 1273 to the rear cover 1406 by the hose holder 1377 is now explained. The connecting hose 1273 is fastened to the rear cover 1406 by the hose holder 1377 in the following manner. First, as shown in FIG. 23, the connecting hose 1273 is set inside the hose holder 1377 in such a manner that the U-shaped bottom 1377a and the U-shaped arms 1377b of the hose holder 1377 surround the connecting hose 1273. In this state, the upper engagement claws 1389 of the hose holder 1377 are inserted into the through holes 1406b of the rear cover 1406 (as shown by two-dot chain line in FIG. 23).

Then, in this state in which the upper engagement claws 1389 of the hose holder 1377 are inserted in the through holes 1406b of the rear cover 1406, as shown in FIG. 23, the lower engagement claws 1390 are inserted into the recesses 1406c of the rear cover 1406 by turning the hose holder 1377 around the upper engagement claws 1389 of the hose holder 1377 toward the rear cover 1406 (in a counterclockwise direction as viewed in FIG. 23). By thus inserting and engaging the upper and lower engagement claws 1389, 1390 with the through holes 1406b and the recesses 1406c, the operation of fastening the connecting hose 1273 to the rear cover 1406 is completed. Thus, the connecting hose 1273 is held by the hose holder 1377.

In order to release the connecting hose 1273 from the rear cover 1406, the lower engagement claws 1390 of the hose holder 1377 are pressed down to be disengaged from the recesses 1406c and the hose holder 1377 is detached from the rear cover 1406. Any member which may interfere with the operation of mounting the hose holder 1377 to the rear cover 1406 is not disposed around the rear cover 1406, so that the hose holder 1377 is easily mounted to and removed from the rear cover 1406.

Further, even when the dust collecting cup 1251 and the connecting hose 1273 are not used, the hose holder 1377 may be left attached to the rear cover 1406, so that the risk of loss of the hose holder 1377 is reduced. Further, when the hammer drill 1401 is not used, the hose holder 1377 may be used to fasten a rolled-up power cord 1160 to the rear cover 1406.

As described above, in the dust collecting device 310 according to the third embodiment, as shown in FIG. 20, the connecting hose 1273 is fastened to the rear cover 1406 by the hose holder 1377, so that the connecting hose 1273 is prevented from swaying and thus interfering with the hammer drill operation. Moreover, with the construction in which the upper and lower engagement claws 1389, 1390 are engaged into the through holes 1406b and the recesses 1406c, the hose holder 1377 itself is also prevented from interfering with the hammer drill operation. Further, the connecting hose 1273 and the hose holder 1377 are disposed in an area of the front wall of the rear cover 1406a which is in a blind spot (which is out of user's line of vision) during hammer drill operation, so that the connecting hose 1273 and the hose holder 1377 is prevented from entering user's field of vision. As a result, a decrease in workability during hammer drill operation is more effectively prevented.

According to the above-described third embodiment, with the construction in which the two through holes 1406b are formed in the front wall of the rear cover 1406 and the two recesses 1406c are formed in the bottom wall of the rear cover 1406, and the connecting hose 1273 is fastened to the rear cover 1406 by the hose holder 1377 with the upper and lower engagement claws 1389, 1390 engaged with the through holes 1406b and the recesses 1406c, the hose holder 1377 itself is prevented from interfering with the hammer drill operation. As a result, a decrease in workability during hammer drill operation is prevented.

Further, according to the third embodiment, with the construction in which the through holes 1406b do not communicate with the internal space of the motor housing 1105, dust and dirt is effectively prevented from entering the internal space.

Further, according to the third embodiment, the through holes 1406*b* and the recesses 1406*c* are formed in an area of the front wall of the rear cover 1406 which is in a blind spot (which is out of user's line of vision when viewed from the user side) during hammer drill operation, and the connecting hose 1273 and the hose holder 1377 are disposed in this region. With this construction, the connecting hose 1273 and the hose holder 1377 is prevented from entering user's field of vision. As a result, a decrease in workability in the hammer drill operation is more effectively prevented.

Further, according to the third embodiment, the hose holder 1377 is mounted to and removed from the rear cover 1406 by engaging and disengaging the upper and lower engagement claws 1389, 1390 into and from the through holes 1406*b* and the recesses 1406*c*. Thus, the hose holder 1377 is easily attached to and detached from the rear cover 1406. Furthermore, the hose holder 1377 is engaged with the rear cover 1406 at a plurality of spots (four spots in this embodiment), so that the hose holder 1377 is attached to the rear cover 1406 with stability. As a result, the connecting hose 1273 is fastened to the rear cover 1406 with stability. Further, in the rear cover 1406, only the through holes 1406*b* and the recesses 1406*c* are formed, and an unnecessary projection or the like is not formed. Therefore, such construction prevents occurrence of interference with the hammer drill operation even when the dust collecting cup 1251 and the connecting hose 1273 are not used.

Further, provision of the through holes 1406*b* and the recesses 1406*c* in the rear cover 1406 have the same effect in the third embodiment as in the second embodiment.

In the third embodiment, the hose holder 1377 is described as having a generally U-shaped section which is perpendicular to the height direction of the hose holder 1377, but the hose holder may have any other shape only if the connecting hose 1273 can be fastened to the rear cover 1406. For example, a variation of a hose holder 1577 shown in FIG. 25 may be used.

Figure 25:
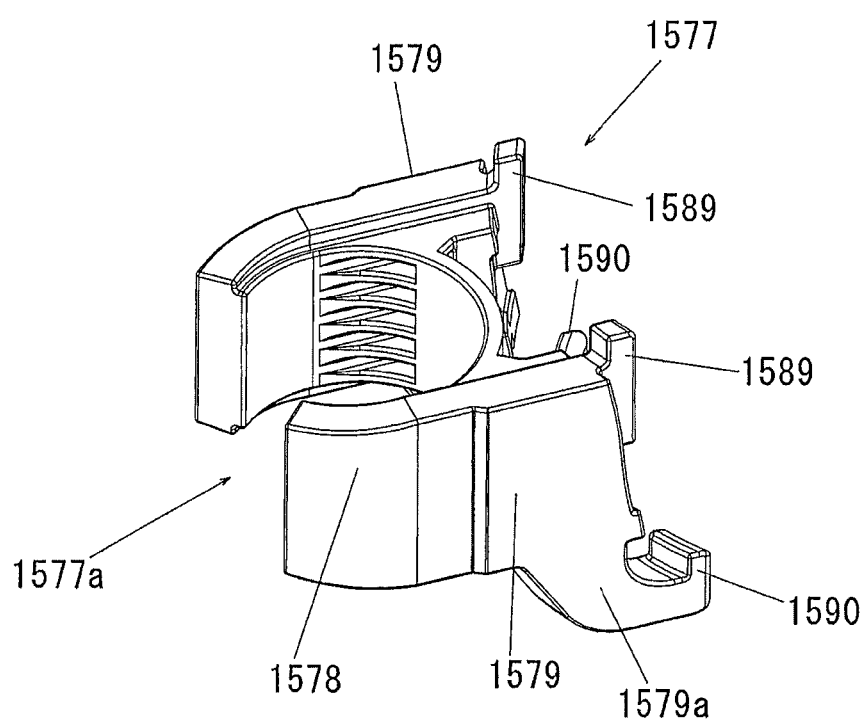
FIG. 25 is a perspective view showing an external appearance of a modified hose holder.

As shown in FIG. 25, the hose holder 1577 includes a hose holding part 1578 and two arms 1579. The hose holding part 1578 has a generally C-shaped section which is perpendicular to the height direction of the hose holder 1577. Specifically, the hose holding part 1578 has an opening 1577*a* on the front (left as viewed in FIG. 25) on the side opposite to the arms 1579. The hose holding part 1578 has an inner diameter substantially equal to or slightly larger than the outer diameter of the connecting hose 1273. Further, the hose holding part 1578 is configured such that the connecting hose 1273 is inserted into the hose holder 1273 through the opening 1577*a*. With this construction, the connecting hose 1273 is attached to the hose holder 1577 even after the hose holder 1577 is attached to the rear cover 1406. The hose holder 1577 is a feature that corresponds to the "holding member" according to the invention.

As shown in FIG. 25, the two arms 1579 extend from the hose holding part 1578 in parallel to each other, and the two arms 1579 extend away from the opening 1577*a* (to the right as viewed in FIG. 25) in the direction of the tangent to the hose holding part 1578. An upper engagement claw 1589 and a lower engagement claw 1590 are formed in pair on each of the arms 1579. The upper engagement claw 1589 and the lower engagement claw 1590 protrude upward in the height direction of the hose holder 1577 (upward as viewed in FIG. 25).

As shown in FIG. 25, the upper engagement claw 1589 is formed on a front end (right end as viewed in FIG. 25) of the arm 1579 on the side opposite to the hose holding part 1578 in the extending direction of the arm 1579 and on an upper end (upper end as viewed in FIG. 25) of the arm 1579 in the height direction of the hose holder 1577. Further, the upper engagement claw 1589 protrudes upward from the upper end surface of the arm 1579.

As shown in FIG. 25, the lower engagement claw 1390 is formed on a front end (right end as viewed in FIG. 25) of the arm 1579 in the extending direction of the arm 1579 and on a lower end (lower end as viewed in FIG. 25) of the arm 1579 in the height direction of the hose holder 1577. Specifically, the lower engagement claw 1590 is formed on an extending part 1579*a* which is formed on the lower end of the arm 1579 and L-shaped in side view. The extending part 1579*a* extends a predetermined distance downward in the height direction of the hose holder 1577 from the lower end of the arm 1579 and then extends in a direction away from the hose holding part 1578 (to the right as viewed in FIG. 25) in the extending direction of the arm 1579. The lower engagement claw 1590 is formed on the front end of the extending part 1579*a* on the side opposite to the hose holding part 1578 in the extending direction of the extending part 1579*a*. The upper engagement claw 1589 and the lower engagement claw 1590 are features that correspond to the "projection" according to the invention.

The same effect as in the third embodiment is also obtained by using the above-described hose holder 1577.

In the third embodiment, the hose holder 1377 and the rear cover 1406 are described as being engaged with each other at four spots, but they may be engaged at any number of spots only if the hose holder 1377 can be attached to the rear cover 1406.

In the third embodiment, the hose holder 1377 is described as being attached to the rear cover 1406 by inserting and engaging the upper and lower engagement claws 1389, 1390 with the through holes 1406*b* and the recesses 1406*c*. The manner of attaching the hose holder 1377 to the rear cover 1406 is not limited to this. For example, an elastic member having an outside dimension slightly larger than the inside dimensions of the through holes and the recesses may be mounted on the front end of each of the U-shaped arms 1377*b* in its extending direction. Then, an elastic force of the elastic member which is generated by engaging the elastic member into the through holes and the recesses may be utilized to attach the hose holder 1377 to the rear cover 1406. Alternatively, the surface friction coefficient of the front end of the arms 1377*b* in the extending direction and the surface friction coefficient of the through holes and the recesses may be increased, and the hose holder 1377 may be held on the rear cover 1406 by utilizing the both frictional forces generated when the arms 1377*b* are engaged with the through holes and the recesses. In this case, the surface friction coefficient of either the arms 1377*b* or the through holes and the recesses may be increased.

In the second and the third embodiments, the through holes 1106*b*, 1406*b* are described as not communicating with the internal space of the motor housing 1105, but they may be provided to communicate with the internal space of the motor housing 1105. In this case, means for preventing dust and dirt from entering the internal space of the motor housing 1105 through the through holes 1106*b*, 1406*b*, or means for preventing leakage of a lubricant such as grease from the internal space of the motor housing 1105 may be provided, as necessary.

Further, in the second and the third embodiments, the through holes 1106*b*, 1406*b* and the recesses 1406*c* are described as being formed in the rear cover 1106, 1406, but they may be formed in the motor housing 1105.

Further, in the second and the third embodiments, the through holes 1106*b*, 1406*b* and the recesses 1406*c* are described as being formed in the rear cover 1106, 1406 itself, but they may be formed in an intermediate member which is separately formed and provided to be attached to the rear cover 1106, 1406.

The second and the third embodiments are explained as being applied in hammer drill operation in hammer drill mode, but the invention can also be applied in drilling operation in drilling mode or hammering operation in hammering mode. Further, a hammer drill is described as a representative example of a power tool, but the invention can also be applied to other power tools where dust is generated by operation, such as an electric hammer in which a tool bit is caused to perform only hammering movement in the axial direction, an electric drill in which a tool bit is caused to perform only rotation in the circumferential direction, and an electric saw for cutting a workpiece.

Having regard to the above-described embodiments, the dust collecting device may have the following features.

(1) "A dust collecting device, which is attached to a power tool actuating a tool bit which is coupled to a front end region of a tool body along a predetermined longitudinal direction and performs at least linear movement in the longitudinal direction, comprising:

a dust collecting member which has a dust suction port for sucking dust, and a holding member which holds a dust transferring member with respect to the tool body, wherein the dust transferring member is removably attached to the holding member and dust sucked up into the dust collecting member through the dust suction port is transferred downstream through the dust transferring member, wherein:

the power tool is configured such that an auxiliary handle designed to be held by a user is removably attached to the tool body, the auxiliary handle includes:

a mounting part which is mounted on the tool body, a handle which extends in a crossing direction crossing the longitudinal direction, and an engagement part which is connected to the mounting part and engageable with the handle, wherein:

the handle is engaged and secured to the engagement part by moving relative to the engagement part in the crossing direction, and the holding member is held between the engagement part and the handle by the relative movement of the engagement part and the handle in the crossing direction."

(2) "The dust collecting device as defined in (1), wherein the holding member has a movement preventing part for preventing the dust transferring member from moving in a dust transferring member extending direction in which the dust transferring member extends, and the movement preventing part is formed as one projection which is engageable with an outer circumferential surface of the dust transferring member, the projection extending in a direction crossing the dust transferring member extending direction with the dust transferring member attached."

(3) "A dust collecting device, which is attached to a power tool actuating a tool bit which is coupled to a front end region of a tool body along a predetermined longitudinal direction and performs at least linear movement in the longitudinal direction, comprising:

a dust collecting member which has a dust suction port for sucking dust and a dust transferring member mounting part to which a dust transferring member is removably attached, wherein dust sucked up into the dust collecting member through the dust suction port is transferred downstream through the dust transferring member, the dust collecting member is configured such that the dust transferring member is attached to the dust transferring member mounting part by relative movement of the dust transferring member and the dust collecting member in a predetermined direction, and the dust transferring member mounting part has a movement preventing part for preventing the relative movement of the dust transferring member mounting part and the dust transferring member in the predetermined direction with the dust transferring member attached."

(4) "The dust collecting device as defined in (3), wherein the movement preventing part is formed as a spiral groove."

(5) "The dust collecting device as defined in (4), wherein a depth of the groove decreases from a base end on the dust suction port side toward a distal end on the opposite side, and wherein the dust transferring member mounting part has an uniform inner diameter between the base end and the distal end."

(6) "The dust collecting device as defined in (3) or (4), wherein the groove extends in a direction crossing the predetermined direction."

(7) "A dust collecting device, which is attached to a power tool actuating a tool bit which is coupled to a front end region of a tool body along a predetermined longitudinal direction, and collects dust generated during operation of the power tool, comprising:

a dust collecting member which is capable of collecting dust generated during an operation, a dust transferring member which is capable of transferring dust collected by the dust collecting member, and a fastening member which is engaged with a tool body inside and fastens the dust transferring member to the tool body."

(8) "The dust collecting device as defined in (7), wherein the fastening member includes a deformable band."

(9) "The dust collecting device as defined in claim (8), wherein the fastening member further includes a band locking part which is capable of locking the band, and the band locking part is changeable its state between a locked state in which the band is locked and a released state in which the locked state of the band is released."

(10) "The dust collecting device as defined in any one of (7) to (9), wherein the fastening member has at least one projection and fastens the dust transferring member to the tool body with the projection inserted in the tool body inside."

(11) "A power tool including the dust collecting device as defined in any one of (7) to (10), comprising:

a motor that actuates the tool bit, and a housing that houses the motor and has a hollow formed inside the housing, wherein the tool body inside is defined by the hollow, and the holding member is inserted into the hollow and holds the dust transferring member to the housing."

(12) "The power tool as defined in (11), wherein the housing has a housing space for housing the motor, and the hollow is open to an outer surface of the housing and not deep to communicate with the housing space."

(13) "The power tool as defined in (11) or (12), wherein the motor has a rotating shaft, the rotating shaft is disposed within the housing space such that an axial direction of the rotating shaft crosses the longitudinal direction, the housing has a cylindrical shape, an axial direction of the cylindrical shape being parallel to the longitudinal direction, and the hollow is formed in an area which is in a blind spot when the housing is viewed from behind or from the opposite side of the front end region in the longitudinal direction."

(14) "The power tool as defined in any one of (11) to (13), wherein at least two such hollows are formed in the housing."

(15) "The power tool as defined in any one of (11) to (14), wherein the motor has a brush, and the housing includes a motor housing which defines the housing space, and a rear cover which is attached to the motor housing and is detachable for replacement of the brush, wherein the hollow is formed in the rear cover.

(16) "The power tool as defined in any one of (7) to (10), wherein the dust collecting member is disposed to surround the tool bit.

Correspondences Between the Features of the Embodiment and the Features of the Invention The above-described embodiment is a representative example for embodying the invention, and the invention is not limited to the constructions described as the representative embodiments. Correspondences between the features of the embodiment and the features of the invention are as follow:

The body 103 corresponds to the "tool body" in this invention.

The hammer bit 200 corresponds to the "tool bit" in this invention.

The dust collecting hood 141 corresponds to the "dust collecting member" in this invention.

The dust collecting hose 143 corresponds to the "dust transferring member" in this invention.

The hose holder 145 corresponds to the "holding member" in this invention.

The side handle 110 corresponds to the "auxiliary handle" in this invention.

The mounting ring 111 corresponds to the "mounting part" in this invention.

The grip 121 corresponds to the "handle" in this invention.

The grip securing part 131 corresponds to the "engagement part" in this invention.

The flange 123 corresponds to the "flange" in this invention.

The engagement rib 151 corresponds to the "movement preventing part" in this invention.

The engagement rib 151 corresponds to the "projection" in this invention.

The dust collecting device 1210, 1210A, 1310 corresponds to the "dust collecting device" in this invention.

The dust collecting cup 1251 corresponds to the "dust collecting member" in this invention.

The connecting hose 1273 corresponds to the "dust transferring member" in this invention.

The binding band 1277 corresponds to the "holding member" in this invention.

The belt 1278 corresponds to the "holding member" in this invention.

The buckle 1279 corresponds to the "band locking part" in this invention.

The closed state of the buckle plate 1279*b* corresponds to the "locked state" in this invention.

The open state of the buckle plate 1279*b* corresponds to the "released state" in this invention.

The hook-and-loop fastener 1277A corresponds to the "holding member" in this invention.

The hose holder 1377, 1577 corresponds to the "holding member" in this invention.

The upper engagement claw 1389, 1589 corresponds to the "projection" in this invention.

The lower engagement claw 1390, 1590 corresponds to the "projection" in this invention.

The hammer drill 1101, 1401 corresponds to the "power tool" in this invention.

The hammer bit 1119 corresponds to the "tool bit" in this invention.

The space 1106*a*, 1406*a* corresponds to the "tool body inside" in this invention.

The space 1106*a*, 1406*a* corresponds to the "hollow" in this invention.

The through hole 1106*b*, 1406*b* corresponds to the "tool body inside" in this invention.

The through hole 1106*b*, 1406*b* corresponds to the "hollow" in this invention.

The recess 1106*c*, 1406*c* corresponds to the "tool body inside" in this invention.

The recess 1106*c*, 1406*c* corresponds to the "hollow" in this invention.

The driving motor 1104 corresponds to the "motor" in this invention.

The motor shaft 1104*a* corresponds to the "rotating shaft" in this invention.

The brush 1104*b* corresponds to the "brush" in this invention.

The motor housing 1105 corresponds to the "tool body" in this invention.

The motor housing 1105 corresponds to the "housing" in this invention.

The motor housing 1105 corresponds to the "motor housing" in this invention.

The rear cover 1106, 1406 corresponds to the "tool body" in this invention.

The rear cover 1106, 1406 corresponds to the "housing" in this invention.

The rear cover 1106, 1406 corresponds to the "rear cover" in this invention.

DESCRIPTION OF NUMERALS 101 electric hammer
103 body
105 housing
107 barrel
108 chuck
109 handgrip
110 side handle
111 mounting ring
121 grip
123 flange
125 nut
131 grip securing part
133 ring holder
135 bolt
140 dust collecting device
141 dust collecting hood
143 dust collecting hose
143*a* mounting member
143*b* groove
145 hose holder 147 dust suction port
148 hammer bit inserting part
149 hose connecting part
149a engagement groove
149b opening
150 hose engagement part
151 engagement rib
152 side-handle engagement part
153 clamp
153a notch
154 flange
200 hammer bit
1101, 1401 hammer drill
1103 body
1104 driving motor
1104a motor shaft
1104b brush
1105 motor housing
1106, 1406 rear cover
1106a, 1406a space
1106b, 1406b through hole
1406c recess
1107 crank housing
1107a barrel
1107b grip mounting part
1108 chuck
1109 handgrip
1119 hammer bit
1120 motion converting mechanism
1131 piston
1141 cylinder
1141a air chamber
1143 striker
1145 impact bolt
1150 power transmitting mechanism
1160 power cord
1191 tool holder
1193 striking mechanism
1201 side grip
1203 mounting band
1210, 1210A, 1310 dust collecting device
1251 dust collecting cup
1253 cup body
1255 cup mounting part
1259 dust discharge nozzle
1273 connecting hose
1277 binding band
1277A hook-and-loop fastener
1278 belt
1279 buckle
1279a base
1279b buckle plate
1377, 1577 hose holder
1377a U-shaped bottom
1377b U-shaped arm
1377c extending part
1378 projecting rib
1389, 1589 upper engagement claw
1390, 1590 lower engagement claw
1577a opening
1578 hose holding part
1579 arm
1579a extending part

What we claim is:

1. A dust collecting device, which is attached to a power tool actuating a tool bit which is coupled to a front end region of a tool body along a predetermined longitudinal direction, comprising:
   a dust collecting member which is capable of collecting dust generated during an operation,
   a housing defining a hollow between an inner wall of the housing and an outer wall of the housing, the housing having a first opening and a second opening from an exterior of the housing to the hollow, and
   a holding member extending through the first opening, through the hollow, and through the second opening, and engaging with a tool body inside, the holding member holding a dust transferring member to the tool body, the dust transferring member being configured to transfer dust collected by the dust collecting member.

2. The dust collecting device as defined in claim 1, wherein the holding member includes a deformable band.

3. The dust collecting device as defined in claim 2, wherein the holding member further includes a band locking part which is capable of locking the band, and the band locking part is changed its state between a locked state in which the band is locked and a released state in which the locked state of the band is released.

4. The dust collecting device as defined in claim 1, wherein the holding member has at least one projection and holds the dust transferring member to the tool body with the projection inserted in the tool body inside.

5. A power tool including the dust collecting device as defined in claim 1, comprising:
   a motor that actuates the tool bit, and
   a housing having a wall that defines an inner space that houses the motor, the housing including a hollow formed in the wall of the housing, wherein
   wherein the tool body interior space is defined by the hollow, and
   the holding member is inserted into the hollow and holds the dust transferring member to the housing.

6. The power tool as defined in claim 5, wherein the hollow is open to an outer surface of the housing and not deep to communicate with the inner space.

7. The power tool as defined in claim 5, wherein the motor has a rotating shaft, the rotating shaft is disposed within the inner space such that an axial direction of the rotating shaft crosses the longitudinal direction, the housing has a cylindrical shape, an axial direction of the cylindrical shape being parallel to the longitudinal direction, and the hollow is formed in an area which is in a blind spot when the housing is viewed from behind or from the opposite side of the front end region in the longitudinal direction.

8. The power tool as defined in claim 5, wherein at least two such hollows are formed in the housing.

9. The power tool as defined in claim 5, wherein the motor has a brush, and the housing includes a motor housing which defines the inner space, and a rear cover which is attached to the motor housing and is detachable for replacement of the brush, wherein the hollow is formed in the rear cover.

* * * * *